US005664219A

United States Patent [19]
Glassen et al.

[11] Patent Number: 5,664,219
[45] Date of Patent: Sep. 2, 1997

[54] METHOD AND SYSTEM FOR CONTROLLING SERVICABILITY OF ADAPTERS CONNECTED BY AN I/O CHANNEL INTERFACE TO A COMPUTER SYSTEM

[75] Inventors: Steven Gardner Glassen, Wallkill; Marten Jan Halma, Poughquag; John Scott Trotter, Pleasant Valley, all of N.Y.

[73] Assignee: International Business Machines Corporation, Armonk, N.Y.

[21] Appl. No.: 489,421

[22] Filed: Jun. 12, 1995

[51] Int. Cl.$^6$ ..................................... G06F 3/00
[52] U.S. Cl. ............... 395/825; 395/828; 395/200.5
[58] Field of Search .................. 395/827, 825, 395/821, 500, 650, 681, 712, 200.05, 828

[56] References Cited

U.S. PATENT DOCUMENTS

| | | | |
|---|---|---|---|
| 4,156,111 | 5/1979 | Downey et al. | 370/83 |
| 4,161,026 | 7/1979 | Wilhite | 395/775 |
| 4,363,093 | 12/1982 | Davis et al. | 395/200.12 |
| 4,631,666 | 12/1986 | Harris et al. | 395/309 |
| 4,803,622 | 2/1989 | Bain, Jr. et al. | 395/825 |
| 5,204,950 | 4/1993 | Kawashima | 395/821 |
| 5,265,239 | 11/1993 | Ardolino | 395/500 |
| 5,377,337 | 12/1994 | Antognini et al. | 395/375 |
| 5,414,851 | 5/1995 | Brice, Jr. et al. | 395/650 |
| 5,459,838 | 10/1995 | Coscarella et al. | 395/827 |

Primary Examiner—Thomas C. Lee
Assistant Examiner—D. Dinh
Attorney, Agent, or Firm—Bernard M. Goldman

[57] ABSTRACT

A method and system to eliminate service hardware previously provided with an adapter by providing a novel way to transfer its hardware service functions to a remote service hardware found elsewhere in a computer system, such as a mainframe. The transferred service controls include enabling the remote service hardware to control the updating of the adapter microcode; remotely control a recovery process for the adapter by remotely initializing its microcode, and remotely logging out and recovering from error conditions detected in the adapter; and remotely forcing a logout and recovery when the host OS detects a failure in the adapter. A standard I/O channel interface (optical or electronic) is provided between the adapter and an IOSS (Input Output Subsystem) of a computer system which has its own service processor element (SPE) used for servicing the computer system per se. The invention provides virtual service hardware for the adapter, but uses the SPE for its service hardware. The SPE is remote from the adapter in the sense that the SPE and the adapter can only communicate with each other over the standard I/O channel interface. The servicing functions required by the adapter are transferred to, and handled by, the SPE by internal I/O facilities (iIOF) provided in the IOSS, which change the internal subchannel architecture of the IOSS.

13 Claims, 34 Drawing Sheets

FIG. 6

| | | | | | | | | |
|---|---|---|---|---|---|---|---|---|
| 0 | KEY | S | 0 | 0 | 0 | F | P | I | 0 0 0 0 0 | LPM | 0 0 0 0 0 0 0 |
| 1 | INTERRUPTION PARAMETER |
| 2 | CHANNEL PROGRAM ADDRESS |

FIG. 7

| | | | | | | | | | | |
|---|---|---|---|---|---|---|---|---|---|---|
| 0 | KEY | S | L | CC | F | P | I | 0 | 0 | Z | E | N | 0 | FC | AC | SC |
| 1 | CPA ADDRESS/CCW ADDRESS |
| 2 | DEVICE STATUS | SCH STATUS | COUNT |
| 3 | SUBCHANNEL LOGOUT |
| 4 | EXTENDED REPORT WORD |
| 5 | 0 0 0 0 0 0 0 0 0 0 0 0 0 0 0 0 0 0 0 0 0 0 0 0 0 0 0 0 0 0 0 0 |
| 6 | ZEROS |
| 7 | |
| 8...15 | EXTENDED CONTROL WORD |

FIG. 8

| word | \  columns | | | | | | | |
|---|---|---|---|---|---|---|---|---|
| 0 | 0 0 | ISC | 0 0 | A | E | LM | MM | D | T | V | INTERRUPTION PARAMETER |||||||
| 1 | DEVICE NUMBER |||||||
| 2 | LPM | LPUM | PIM | PAM |
| 3 | PNOM | POM | MBI |||
| 4 | CHPID-0 | CHPID-1 | CHPID-2 | CHPID-3 |
| 5 | CHPID-4 | CHPID-5 | CHPID-6 | CHPID-7 |
| 6 | 0 0 0 0 0 0 0 0 | 0 0 0 0 0 0 0 0 | 0 0 0 0 0 0 0 0 | 0 0 0 0 0 0 0 S |
| 7 | SUBCHANNEL STATUS WORD |||||||
| 8 | |
| 9 | |
| 10 | LINK ADDR-0 | CUA-0 | LINK ADDR-1 | CUA-1 |
| 11 | LINK ADDR-2 | CUA-2 | LINK ADDR-3 | CUA-3 |
| 12 | LINK ADDR-4 | CUA-4 | LINK ADDR-5 | CUA-5 |
| 13 | LINK ADDR-6 | CUA-6 | LINK ADDR-7 | CUA-7 |
| 14 | DEVICE ADDRESS | S | 0 | F | B | IAI | 0 0 0 0 0 0 0 0 | 0 0 0 0 0 V | T | E | 0 | P | PrefP |
| 15 | LOGICAL CONTROL UNIT ADDRESS |||||||

FIG. 9

| | | | | | INTERRUPTION PARAMETER | | |
|---|---|---|---|---|---|---|---|
| 0 0 | 0 0 | E | MM | D | T | | |
| | | | | | | DEVICE NUMBER | |
| LPM | | | PNOM | | | LPUM | PIM |
| MBI | | | | | | POM | PAM |
| CHPID-0 | | | CHPID-1 | | | CHPID-2 | CHPID-3 |
| CHPID-4 | | | CHPID-5 | | | CHPID-6 | CHPID-7 |
| 0 0 0 0 0 | | | 0 0 0 0 0 0 0 | | | 0 0 0 0 0 0 0 | 0 0 0 0 0 0 S |
| 0 0 0 0 0 | | | 0 0 0 0 0 0 0 | | | 0 0 0 0 0 0 0 | 0 0 0 0 0 0 0 |
| LINK ADDR-0 | | | CUA-0 | | | LINK ADDR-1 | CUA-1 |
| LINK ADDR-2 | | | CUA-2 | | | LINK ADDR-3 | CUA-3 |
| LINK ADDR-4 | | | CUA-4 | | | LINK ADDR-5 | CUA-5 |
| LINK ADDR-6 | | | CUA-6 | | | LINK ADDR-7 | CUA-7 |
| DEVICE ADDRESS | S | 0 | IAI | | | 0 0 0 0 0 0 0 0 | V T E O P PrefP |

FIG. 10

INTERRUPTION PARAMETER

| LPM | 0 0 | E | MM | D | T | PNOM | LPUM | PIM |
|-----|-----|---|----|----|---|------|------|-----|
| 0 0 | 0 0 |   |    |    |   | MBI  | POM  | PAM |

DEVICE NUMBER: 0000000000000000000000000000000S

DEVICE ADDRESS | IAI | 0 | 0000000 | V | T | E | O | P | PrefP

LOGICAL CONTROL UNIT ADDRESS

SID:

| R | M |

R = REQUEST TO SEE CHANNEL RESET FUNCTIONS
M = REQUEST TO SEE CHANNEL-RELATED MACHINE CHECKS

OPERAND:

| 0 | 0 | WORK AREA SIZE |
| --- | --- | --- |
|  |  | WORK AREA ORIGIN |

FIG. 12

| 1ST DIAGNOSTIC SUBCHANNEL # | # OF DIAGNOSTIC SUBCHANNELS |
| --- | --- |
| 1ST SHADOW SUBCHANNEL # | # OF SHADOW SUBCHANNELS |
| BASE ADDRESS OF APPLICATION WORK AREA | |

| | 1805 | 1801 | 1802 | | |
|---|---|---|---|---|---|
| | 0  7 | 8  15 | 16  23 | 24 28 | 31 |
| 00 | CHPID | FUNCTION ID | STATUS | 0000 | RSVD |
| 01 | SCSW 0 ||||| 
| 02 | SCSW 1 |||||
| 03 | SCSW 2 |||||
| 04 – 13 | ADDITIONAL PARMS (SEE BELOW) — 1803 |||||
| 14 | 0 |||||
| 15 | 0 |||||

CHPID: IDENTIFIES THE CHANNEL PATH THAT THE OFPA WILL BE USED FOR.
SET UP AT IOSS INITIALIZATION TIME

FUNCTION ID: SET BY SUPPORT PROCESSOR TO BE THE FUNCTION IT WANTS PERFORMED.
SOME SUPPORTED FUNCTIONS:

'00'X=NO COMMAND TO PERFORM
    '01'X=ALTER OSA MEMORY (REQUIRES ADDITIONAL PARAMETERS)
    '02'X=DISPLAY OSA MEMORY (REQUIRES ADDITIONAL PARAMETERS)
    '03'X=RESET OSA (NO ADDTL PARAMETERS)
    '05'X=SET PORT ENABLE/DISABLE (REQUIRES ADDITIONAL PARAMETERS)
    '10'X=ENABLE I/O (NO ADDTL PARAMETERS)

STATUS: PROGRESS OF FUNCTION:

'00'X=SET BY SP PRIOR TO SIGNALLING SERVICE FUNCTION
    '01'X="FUNCTION STARTED" BY OSA/IA
    '02'X="FUNCTION COMPLETED SUCCESSFULLY"
    OTHER="FUNCTION FAILED" REASON

SCSW0,1,2: SUBCHANNEL STATUS WORD FOR ADDITIONAL INFORMATION

ADDL. PARMS: FUNCTION ID DEPENDENT

FIG. 19

| | 0         7 8           15 16        23 24              31 |
|---|---|
| 04 | 0 \| '41'X \| NO. OF BYTES TO WRITE |
| 05 | F\| OSA CARD MEMORY ADDRESS TO WRITE TO |
| 06 | 0 |
| 07 | 0 |
| 08 | 0 |
| 09 | 0 |
| 10 | 0 |
| 11 | 0 |
| 12 | SSA ADDRESS OF DATA TO WRITE |
| 13 | 0 |

F: FLASH BIT
  0 = RAM
  1 = FLASH

FIG. 20

| | 0         7 8           15 16        23 24              31 |
|---|---|
| 04 | 0 \| '42'X \| NO. OF BYTES TO READ |
| 05 | F\| OSA CARD MEMORY ADDRESS TO READ FROM |
| 06 | 0 |
| 07 | 0 |
| 08 | 0 |
| 09 | 0 |
| 10 | 0 |
| 11 | 0 |
| 12 | SSA ADDRESS TO READ DATA INTO |
| 13 | 0 |

F: FLASH BIT
  0 = RAM
  1 = FLASH

| | 0 | 7 | 8 | 15 | 16 | 23 | 24 | 31 |
|---|---|---|---|---|---|---|---|---|
| 04 | 0 | | '15'X | | | 0 | | |
| 05 | 0 | | PORT NUMBER | | D | 0 | | |
| 06 | | | | 0 | | | | |
| 07 | | | | 0 | | | | |
| 08 | | | | 0 | | | | |
| 09 | | | | 0 | | | | |
| 10 | | | | 0 | | | | |
| 11 | | | | 0 | | | | |
| 12 | | | | 0 | | | | |
| 13 | | | | 0 | | | | |

PORT NUMBER: PORT THAT IS BEING ENABLED OR DISABLED
D:         1 = DISABLE PORT
           0 = ENABLE PORT

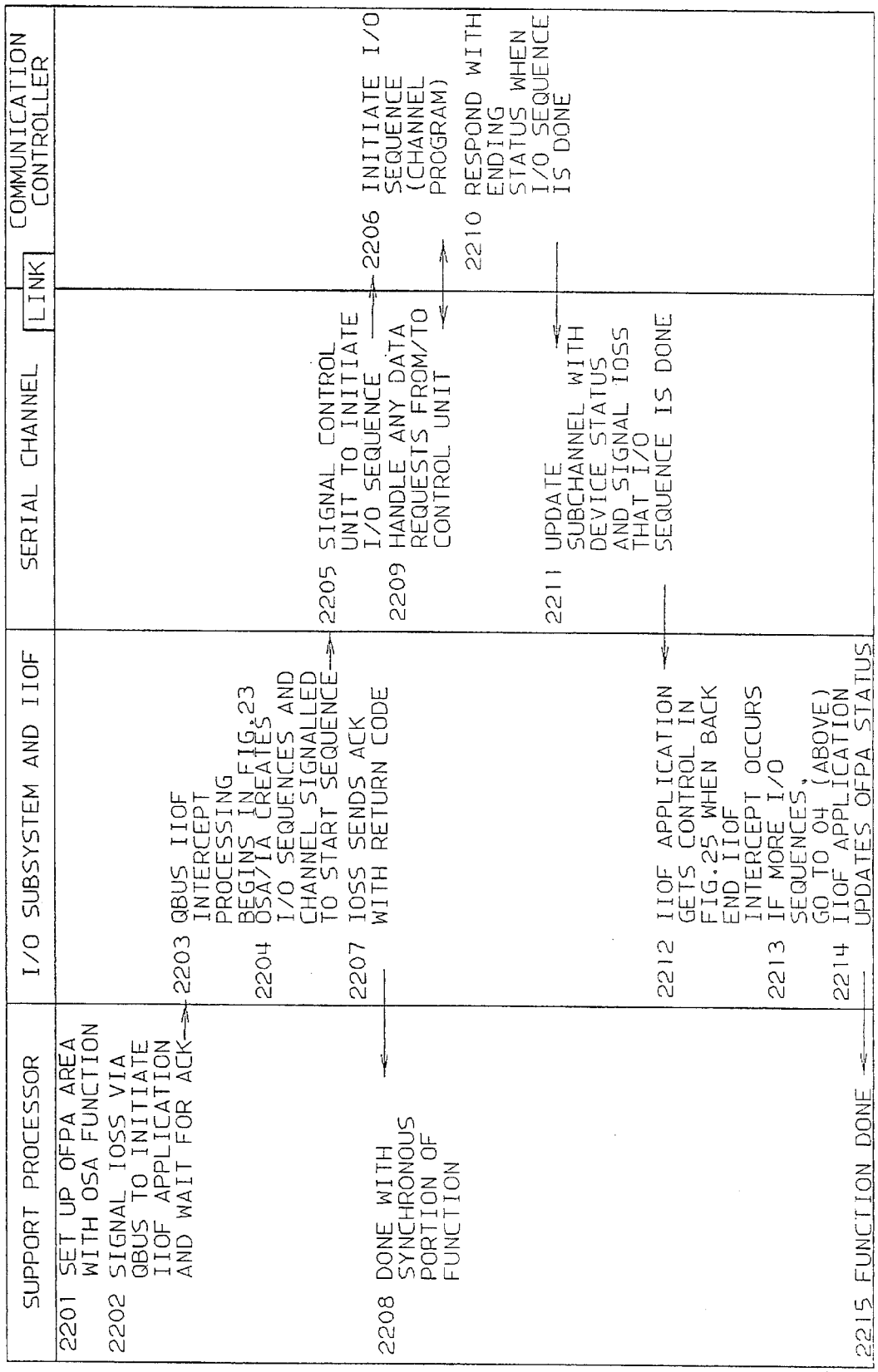

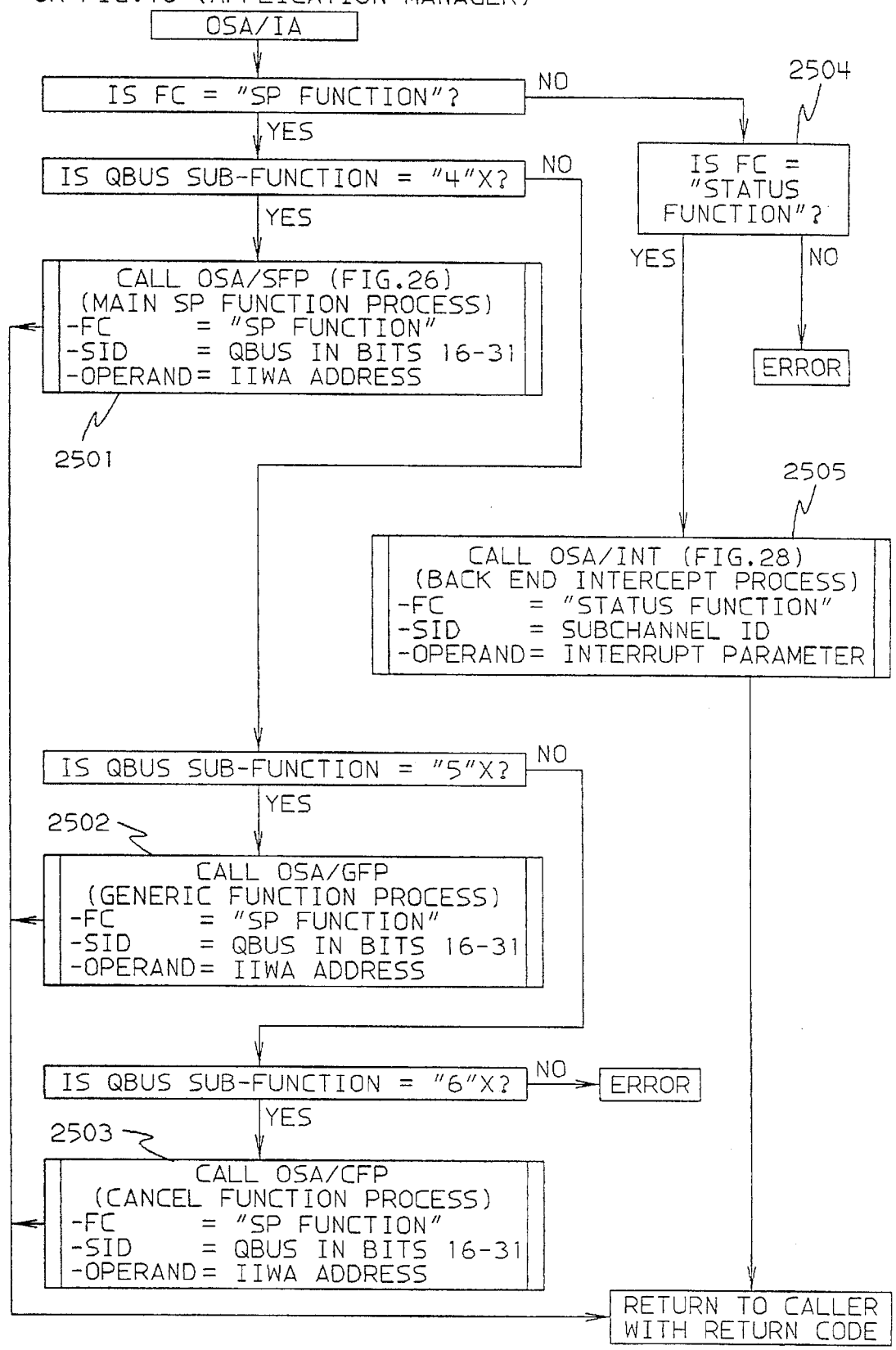

FIG. 33

| SUPPORT PROCESSOR | I/O SUBSYSTEM AND IIOF | SERIAL CHANNEL | LINK | COMMUNICATION CONTROLLER |
|---|---|---|---|---|
| 3301 SET UP OFPA TO "READ MASTER FILE" | | | | |
| 3302 FROM MASTER FILE DATA, DETERMINE IF CODE LEVELS MATCH. IF YES, GO TO STEP 07 | PROCESS IN FIG.22 | | | |
| 3303 LOAD NEW LEVELS OF CODE FROM SP DASD INTO SSA OCDA | | | | |
| 3304 SET UP OFPA TO "WRITE LOAD MODULE" | | | | |
| 3305 SET UP OFPA TO "WRITE MASTER FILE" (UPDATED) | | | | |
| 3306 OFPA FUNCTION= "RESET OSA". AND GO TO STEP 10 | PROCESS IN FIG.37 MINUS THE LOGGING TO FLASH | | | |
| 3307 OFPA FUNCTION= "ENABLE PORTS" | | | | |
| 3308 OFPA FUNCTION= "ENABLE I/O". | PROCESS IN FIG.22 | | | |
| 3309 OSA DEVICES NOW ACCESSIBLE | | | | |
| 3310 END PRI | | | | |

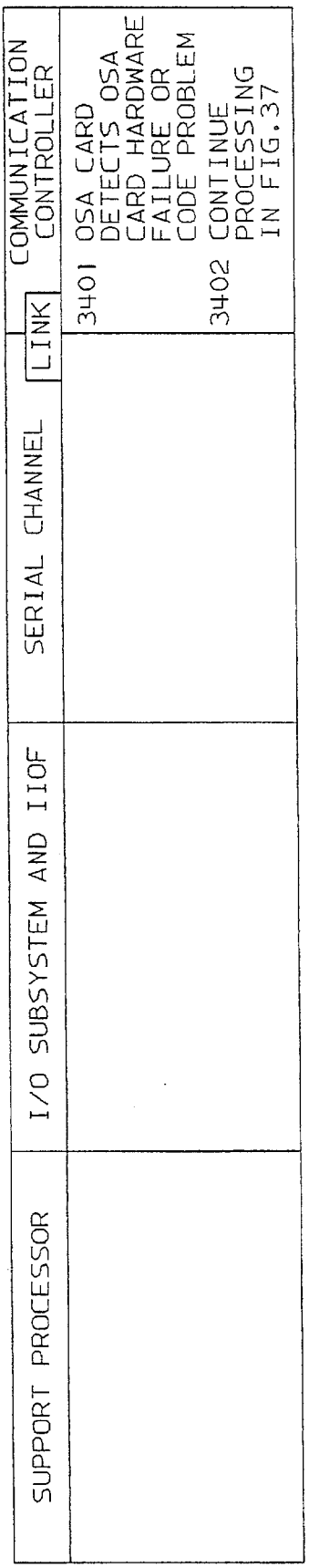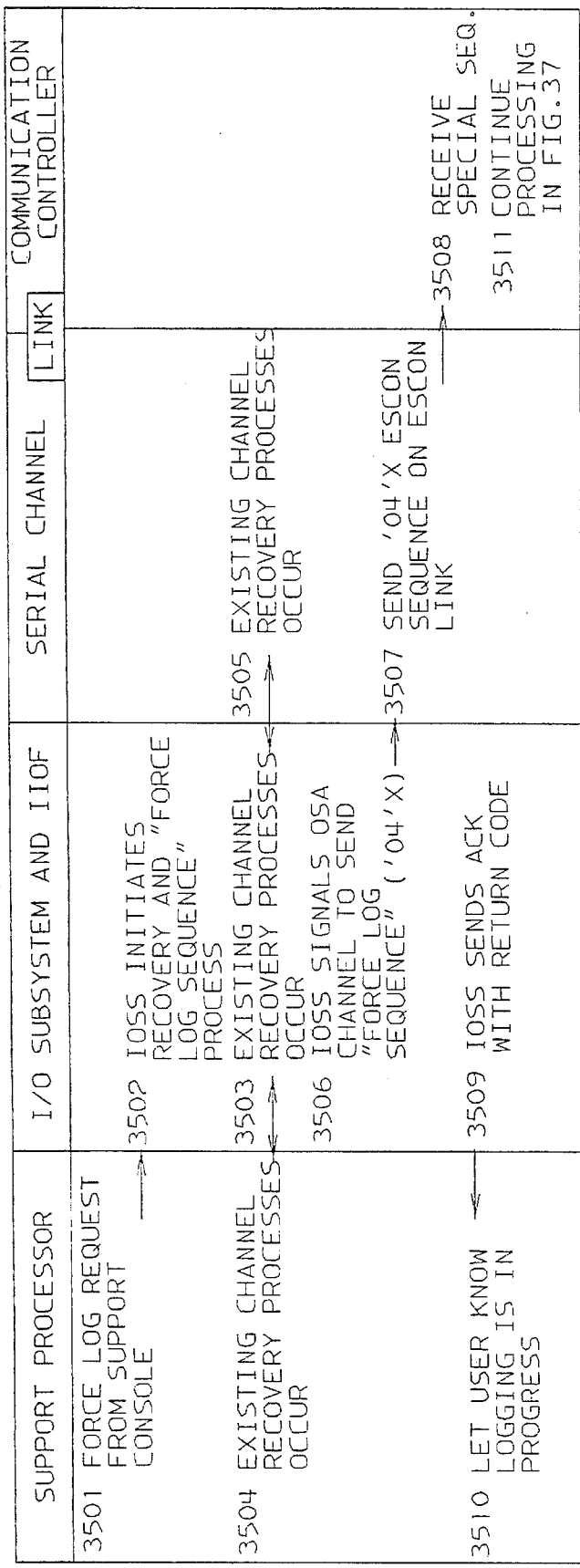

METHOD AND SYSTEM FOR CONTROLLING SERVICABILITY OF ADAPTERS CONNECTED BY AN I/O CHANNEL INTERFACE TO A COMPUTER SYSTEM

INTRODUCTION

The subject invention reduces the cost of complex adapters and control units which previously required directly-connected servicing hardware (such as keyboards, floppy disk drives and display monitors). This invention eliminates the directly-connected servicing hardware by enabling a transference of their servicing functions to remote servicing hardware connected elsewhere in the system at locations not having any direct connection to, or direct communication with, the serviced adapter or control unit. The invention enables the servicing functions to be controlled from the remote location in the system. This invention enables both manual and automatic handling of servicing processes for a complex adapter from remote servicing hardware, whereby the servicing previously could only be done manually using dedicated servicing hardware.

INCORPORATION BY REFERENCE

This specification incorporates by reference the entire specification in USA application (PO9-95-013) filed on the same day as this application.

BACKGROUND OF THE INVENTION

Prior processes used for servicing complex I/O adapters and control units required directly-connected servicing hardware - such as keyboards, floppy diskette or tape cassette drives, and display monitors. This servicing hardware was used to manually control the servicing of the adapter (or control unit), such as initiating the loading of code from a floppy diskette, starting execution of code, and handling error conditions occurring during operation. This servicing hardware correspondingly increased the manufacturing cost of the connected adapter or control unit.

Generally, the prior manual control process was done in several steps: First, the adapter or control unit had to be physically or logically removed from the system. This usually required commands to be issued from the directly-connected console to the adapter and its attached devices, so programs running in the system could not access the adapter and connected devices while servicing was being performed. It was important to prevent access to the adapter or control unit while it was being serviced because if an I/O operation was directed to it during a servicing operation, unpredictable operations (e.g. missing or lost completion status owed to the host program) may result with regards to that I/O adapter.

The following is an example of manual steps provided at a keyboard for controlling the process of loading microcode updates into an adapter or control unit. First, manual keying was needed to load the code typically from a directly-connected floppy diskette or cassette into a nonvolatile storage (such as a hard drive or flash memory) in the complex adapter or control unit. Once the microcode updates were loaded into nonvolatile storage, another manual keyboard step was done to reset the adapter or control unit so the updates could be transferred from the nonvolatile storage into a RAM storage. A final manual keyboard action was needed to start the operation of the adapter or control unit and its devices in order to put them back into service. In addition to all of this, if multiple adapters or control units need to be updated, this manual keyboard process had to be repeated for each of them.

In another service control scenario: when the adapter or control unit had a failure severe enough to prevent internal recovery actions from being successful, a manual keyboard process was used to readout detailed hardware state information from the adapter or control unit about its failure (called logging or logout), and then to manually initiate recovery actions from the keyboard. Typically, when an adapter or control unit detects a severe failure condition, such as a hardware failure or microcode problem, the failure is indicated on its console display or on a LED display, and its operations come to a halt. If the failure was not severe, a unit (device) check interruption signal was presented to the host operating system software with sense data indicating a limited amount of information about the malfunction.

However, the limited sense data alone may not give enough information to correct the problem. To acquire more detailed information about the failure, most control units have buttons and/or switches on a console for indicating to a person who can manually initiate actions of dumping traces and other-pertinent error information for a logout.

The logout information may be received on a storage medium such as a floppy disk, and then it may be hand carried to a computer system to be analyzed. To attempt to recover from the failure usually required manual actuation of an IPL (initial program load) button on the adapter or control unit to reinitialize it. For intermittent failures, the IPL may get the adapter or control unit up and running so it can be used while someone is analyzing the dump data to pin point the problem.

Accordingly in the known prior art, complex adapters and control units required manual intervention at directly-connected service controlling hardware to force logouts, to reset the adapter or control unit, and to reinitialize and start its code.

SUMMARY OF THE INVENTION

The invention enables a reduction in product level costs of complex adapters (capable of almost any type of computer adapter function) by transferring hardware servicing functions previously done manually at directly-connected servicing hardware (such as keyboards, buttons, floppy disk or tape cassette drives, and displays) used for the purpose of controlling the servicing of the generalized adapter. Servicing includes current methods of initialization, updating microcode, logging and recovery of operating errors, etc.

Previously, directly-connected servicing hardware had to be included with its adapter (or control unit), because its removal causes problems such as the following:

1. No other means existed for transferring initialization data and code to an adapter.
2. Connected service hardware was required to "IPL" (initial program load) microcode and to activate operation by the adapter after the microcode was loaded.
3. It was required to load updated versions of microcode into a nonvolatile store in the adapter.
4. It did not provide overlap in the microcode update process.
5. The adapter could not partially operate when a failure had occurred within it.
6. Error data had to be logged out (dumped) to a floppy disk drive or tape cassette connected to the adapter.
7. When logout data was stored in a memory in an adapter, the adapter could not be reset to get it up and running if it has no IPL servicing hardware or Reset button.

8. When the host Operating System reports a missing interrupt, and the adapter is suspect, a human operator had to force an adapter logout onto a connected disk drive.

9. There was no way to log out adapter data and control it to recover from an error condition if an adapter error was detected by the host system and not by the adapter.

This invention provides solutions to the above problems by providing a new way of controlling adapter servicing operations, such as logouts, and resetting the adapter without having to package additional service hardware (floppy disk drives, displays, keyboards) with the adapter. This invention enables transference of adapter logging and recovery data through an I/O channel link (such as an I/O channel fiber) to remote service hardware of the host computer system.

In addition, the invention enables automatic ways for the host system to detect and service adapter problems such as logging and recovery requests originating from the adapter, from the host system, and from remotely-connected service hardware. By providing automatic service invocation controls, this invention reduces the need for manually controlling logouts from the servicing hardware, whether directly or remotely connected to the adapter.

Some service operations may be invoked automatically by the adapter without the host OS being involved at all. The invention supports having the IOSS handle the entire control of some adapter service operations, such as invoking and controlling the storing of adapter error data in a disk drive connected to the IOSS.

Accordingly, shortcomings in the prior art are overcome, and additional advantages are provided, through the methods of this invention for improving the serviceability of adapters and control units connected to a computer system through its I/O interface as described herein.

This invention provides a new way of controlling the servicing of a complex adapter, such as by transferring the servicing controls to another location in a data processing system than having the servicing controls at servicing hardware directly connected to the adapter. The service functions being controlled by this invention may be old service functions in the prior art or may be new service functions. Prior service functions controlled by this invention include servicing the initialization of an adapter, and servicing the error recovery of the adapter. Prior service functions controllable by this invention include placing an adapter in an operational state, such as when power is turned on, or when its hardware is reset, and servicing a detected error condition by logging out data in the adapter held in an error state. Also, this invention allows requests for an adapter service operation to originate in any of a number of different places. For example, such request may originate from within the adapter itself, from the IOSS, or from remote service hardware such as a system console.

Under this invention, each request for servicing the adapter is directed to the IOSS (I/O Sub-System), regardless of the source originating the request, because this invention remotely controls all requests for servicing the adaptor by initiating novel iIOF Application processing in the IOSS.

To initiate iIOF processing, this invention requires each request for servicing a particular adapter to put an IOSS work request, containing a particular subchannel identifier (SCHID), on an IOSS work queue, wherein the identified subchannel is a focal point for selecting and executing a microcoded application (iIOF application). The assigned SCHID acts as a centralized virtual address for a supported set of adapter service functions which are controlled by execution of the microcode in the associated iIOF application. (Note that subchannels and their SCHIDs have been used by prior computer I/O system for representing I/O devices, and the conventional subchannel handles the I/O operations of each I/O device. But the conventional subchannel cannot handle a supported set of services for an I/O device, as is done by the extended subchannels of the subject invention.)

This invention extends the structure and use of conventional subchannels by adding novel fields which are supported by novel iIOF processes for controlling I/O control functions.

The invention requires a small change in the conventional subchannel, and this is the addition of an "iIOF indicator" in the conventional subchannel to indicate it has a novel "iIOF subchannel extender". The location of the "iIOF indicator" is in a predetermined bit position in each conventional subchannel (having a zero value in the conventional subchannel) so that it can be distinguished from iIOF subchannels.

The "iIOF subchannel extender" is not accessible to host software programs, such as the host OS and application programs running on host CPUs. The conventional part of a subchannel is accessible to the host OS. However, diagnostic subchannels (as previously described) are not accessible to the host OS.

Each IOSS subchannel is associated with a device on a one-to-one basis. Each subchannel is identified by an IOSS subchannel number, which is used for assigning a subchannel to a set of IOSS processes. Therefore, each iIOF subchannel may be considered to represent a "device" which is the recipient of a subset of IOSS functions, herein called iIOF functions. However, the diagnostic subchannels may be modified (as previously described) to change the assignment to different devices as needed.

For example, an iIOF subchannel may be assigned to a set of service functions for an adapter. In this example, an IIOF subchannel is assigned (by using its subchannel number) representing this set of service functions for a real device, such as an adapter. The restriction of this iIOF subchannel to a subset of functions for the real device permits this subchannel to be considered as assigned to a pseudo-device (the subset of service functions), and other subchannels (iIOF and non-iIOF subchannels) may be assigned to other subsets of functions for this same real device (adapter). Each request made to the IOSS for any service function in the subset will contain the "subchannel identifier" (subchannel address) for the pseudo-device assigned by this invention to access that subset of iIOF functions for the associated adapter.

In the preferred embodiment described herein, the "device" is a complex adapter comprising an OSA card (Open System Adapter card), which connects an S/390 host system to a LAN (local area network) using non-S/390 communication protocols to devices connected in the LAN. The OSA card converts the communication signal protocols in both directions between the S/390 system and the LAN. The "adapter service subchannel" in the IOSS makes the OSA card appear to the S/390 system as an "I/O device" having available to it the services supported by iIOF application microcode accessed through the assigned subchannel. In the preferred embodiment, subchannel address 'FF'X is assigned to this OSA card service subchannel in the IOSS, and this subchannel is used exclusively for controlling the OSA Card Service Functions.

Note that the assigned subchannel is only associated with supported servicing operations for the OSA card. These supported servicing operations may include microcode initialization, error logging, and recovery services for the OSA card. There may be unsupported servicing functions that cannot be accessed using this subchannel.

As previously stated herein, conventional IOSS processing examines each subchannel taken from multiple conventional I/O queues on which central processors (CPUs) of the host system enqueue subchannels, and on which the IOSS enqueues subchannels having pending interruptions. The conventional I/O queues include an "I/O work queue", and an "I/O interruption" queue. For example, any CPU may enqueue a subchannel on the "I/O work queue" by executing a "start subchannel instruction". Conventional IOSS processes place subchannels on the "I/O interruption" queue when it receives status information from an I/O device indicating a pending interruption condition.

The conventional queues are also used by this invention for entering iIOF processing, which receives subchannels from the conventional IOSS queues for iIOF processing.

Both conventional and iIOF subchannel processing take and put subchannels onto the conventional I/O queues. Each subchannel taken from a conventional queue is checked for any iIOF indication to determine if the subchannel is to be processed by conventional IOSS main processes when there is no iIOF indication, but the subchannel is intercepted and processed by iIOF processes within this invention when there is an iIOF indication in the subchannel.

The prior art microcoded IOSS processes (herein called "IOSS main") are then slightly modified by this invention to initially check each subchannel when any subchannel taken from any IOSS queue to determine if the iIOF controls indicate that the subchannel needs to be processed by the iIOF. If this initial checking process finds that the iIOF processing is not required, the subchannel is processed in the conventional manner by the prior art IOSS main processes. But if the initial checking process finds the subchannel needs iIOF processing, then the conventional IOSS main processing is "intercepted", and processing of the subchannel is diverted to the iIOF processes provided by the subject invention.

Each iIOF subchannel contains a conventional subchannel control block which has an iIOF extension that contains at least one interception control field, and an IAI field. Each interception control field is associated with a particular IOSS interface queue. The preferred embodiment uses interception control fields F and B, and each is a single bit. Field F is only associated with the IOSS work queue, which means that field F can cause an interception only if set to interception state when its subchannel is being removed from the I/O work queue. Field B is only associated with the IOSS interruption queue, which means that field B can cause an interception only if set to interception state when its subchannel is about to be put on the I/O interruption queue. Each interception control field is preferably set to an initial state prior to using the iIOF.

When the IOSS main processing senses an interception state is indicated (the examined F or B field is on) in the interception field being tested, the IOSS main processing "intercepts" the IOSS main processing by calling an iIOF application manager (IAM) process which enters microcode of an iIOF application (IA) to perform an iIOF function represented by that code. The entry point in the IA is determined from the IAI field in the subchannel extension. Then, the IA is executed beginning at the IAI address.

If the examined F or B field is off, the IOSS main processing continues executing in the conventional IOSS manner and ignores the iIOF subchannel extension.

The F and B fields can also be set dynamically by execution of the IA to control a subsequent execution of the IA. The IAI field in the subchannel extension may be changed by the IA. IAI addresses (indicators) may be respectively associated with the F and B fields and may be used on the occurrence of different events. Also, the IAI addresses (indicators) may be dynamically changed by IA execution—for example to switch the iIOF processing to a different service function.

If the iIOF subchannel was obtained from the I/O work queue, the IOSS main tests the F bit state. If the F bit is found to be on, the IAM is called and it calls the IA which is entered at an address obtained from the IAI field. The entered address, in the example, executes a process for obtaining and controlling a particular service supported in the IA for the adapter service subchannel.

Thus, in some cases, only one of bits F and B are used, such as with iIOF subchannels that are only to obtain iIOF processing when accessed from one of the IOSS queues.

Other iIOF controlled functions can be provided for the same adapter by assigning other iIOF subchannels to the adapter to respectively execute different IA code for the different iIOF functions, or changing the IAI in the subchannel to indicate a different IAI.

Still other subchannels may be associated with the same adapter for supporting conventional types of I/O functions. For example, a conventional subchannel may be provided for each of real devices connected to an adapter, and these conventional subchannels can support individual communications with each of these devices.

Therefore in a preferred embodiment, the IA execution for an "adapter service subchannel" is used to transfer the service operations of the adapter to a host system Support Processor Element to enable its keyboard, display and disk drive to be used for servicing the I/O adapter with servicing operations such as microcode loading and initialization, error logging, and recovery services.

In the case of the "host system Support Processor Element" (SPE), the SPE has the highest priority of operations in the entire system because its support operations may have to override any other operation in the system, such as when another operation is failing. Because of its highest priority status, the SPE is allowed to bypass the F and B bits and the IAM controls by being allowed to directly use the IAI addresses for controlling respective adapter services, which the SPE obtains from a service table available only to the SPE. The SPE can then key in a code for an adapter service, and SPE microcode will access SPE service table to obtain and send the IAI for the requested function to the iIOF in the IOSS and immediately start execution of the requested IA function at a next point of interruption for the IOSS.

In much of the same way as the IAM process invokes microcode of an IA to perform an iIOF function, the iIOF Support Manager will invoke an IA determined from the IAI. However, the IAI will be passed to the IOSS when the SPE interrupts the IOSS with a unique intercept value. When the intercept occurs, the IOSS will look at additional information that is passed from the SPE to determine the iIOF function that the SPE wants to perform.

The adapter may have a service function initiated from any of plural different sources, such as itself when it detects an error condition. Or an adapter service function may be initiated by the host if it detects an error condition, such as missing adapter interruption information.

In the example of an adapter which is an OSA card, an automatic initiation mechanism may be in the execution of the IA to control a logout and recovery of the OSA card when the OSA card has an error condition. The adapter can internally detect and communicate a failure to the IOSS system. Further, the IA includes a process for the host system to initiate logging and recovery of the OSA card operation either automatically when the host system detects an OSA card failure, or manually from the host system's Support Console when it is deemed necessary to manually control the OSA card's logging and recovery.

Circuits on the OSA card reset its circuits, and receive operational microcode in a flash memory (flash), and transfer the microcode from the flash to a RAM (random access memory) on the OSA card. In addition, the flash is used to save various kinds of initialization data such as MAC addresses, which can be logged out under IA control.

Because of these IA functions supported in the iIOF, no dedicated servicing hardware is needed with the OSA card, since the IA functions enable OSA signalling and communication protocols between the OSA card and the IOSS to logout and recover the OSA card data over an ESCON channel link between them. The elimination of the servicing hardware for the OSA card significantly reduces its packaged manufacturing cost.

Hence in the preferred embodiment, the Support Processor Element (SPE) for a host S/390 system is used as the service control hardware for an OSA card by using the iIOF execution of an IA to transfer the OSA card service hardware functions to the Service Processor Element, and visa versa. Thus, the IA execution controls the transfer of service data between the OSA card and the SPE to enable the SPE to control the service operations for the OSA card. Thus, the SPE may be keyboarded to update the adapter microcode, or to reset all circuits on the OSA card, or to dump error logouts into its Direct Access Storage Device (DASD) of the SPE.

When a service is requested from the SPE to the IOSS, the iIOF application is executed to build a required microprogram sequence of I/O instructions (e.g. microcoded CCWs) in the IOSS (or in any protected storage area not accessible to host software) to control OSA data transfers to the SPE to control a requested service operation through the connected channel. This microprogram sequence enables the Support Processor to communicate with the OSA card through the IOSS by using the assigned iIOF subchannel in the IOSS. Therefore the iIOF is a focal point in the IOSS for communication between the adapter service facilities (by providing an I/O address reserved for use only by adapter servicing operations.

In this manner, the iIOF application can use the iIOF subchannels in a process that shifts both human and automatic control over certain adapter service functions to a support processor (which may include shifting adapter service functions requiring use of a keyboard and display monitor means) by shifting them to such means associated with the support processor, and thereby avoid the need for providing the adapter with its own keyboard and display monitor means—resulting in a significant economic cost reduction for the adapter.

In another example, suppose each-transmitted data file is to be compressed and cryptographed, and each received data file is to be decompressed and decryptographed. This may be automatically done using the controls of this invention without the human senders/receivers, or the system software, being aware of the existence of this processing. The host OS will select the assigned subchannel for the device which is to do the transmission/reception operation. The system may then add this invention by making that subchannel an iIOF subchannel by adding an iIOF extender to that subchannel. The extender's IAI fields are set to address the microcoded compression and cryptographic processes which are loaded into a protected location accessible to the iIOF functions. Also in the iIOF extender, the F bit is set on and the B bit are set off. The on F bit state forces an "iIOF interception" from the prior IOSS processing when the IOSS takes that subchannel from the IOSS work queue to process it, which is before the IOSS can start to perform its data transmission operation for any transmission/receive request to that subchannel by the host OS. (If the B bit state were on it would force an "iIOF interception" when the IOSS takes that subchannel from the IOSS interruption queue to process it, which is before the IOSS can send the interruption to the host OS to signal a completion of the requested transmission operation.)

IOSS processing for an OS transmission request begins when the IOSS main process takes the subchannel from the IOSS request queue, and detects that it is an iIOF subchannel, and detects the F bit is on and intercepts to the iIOF manager (IAM) process. The IAM accesses the IAI field in the extender to determine the address used to enter and start execution of the iIOF compression application process (application) on the data file (or a predetermined part of it).

After the iIOF compression process is completed on the data file (or a part of it), the iIOF application process passes control to an iIOF microcoded cryptographic process. When the cryptographic process is completed on the data file (or a predetermined part of it), the application sets the F bit to off state, and enqueues the iIOF subchannel on the IOSS work queue. The IOSS main process then takes that subchannel off the work queue, and again passes the subchannel to the IAM, which finds the F bit off and calls the IOSS main process to begin its normal work processing which is to transmit the data file (or a predetermined part of it). Upon completion of the IOSS transmission processing, the IOSS enqueues the subchannel on the IOSS interruption queue. Since the B bit is off, no back-end iIOF application processing is then to be done. The IOSS main processing for the subchannel then sends an interruption signal to the host OS to indicate that IOSS processing has been completed for the host transmission request.

Since the compression and cryptographic processes exist only in microcode and only are accessible to the iIOF in the IOSS, and are not accessible to the host software, the host application programs and OS will not be aware that processing by the compression and cryptographic processes was performed for the host transmission request.

Accordingly, the invention enables the host and IOSS to preserve most of the same protocols and use the same host software that were used in prior channel programs to control I/O and to also use the iIOF operations of this invention to control I/O in a manner that was not previously feasible because they previously would have been totally incompatible with the same protocols and host software.

BRIEF DESCRIPTION OF THE DRAWINGS

In FIG. 1:

SIGW=Signal Work

CPU=Central Processing Unit

SIGI=Signal Interruption

IOSS=Input/Output Subsystem

Figure 2:
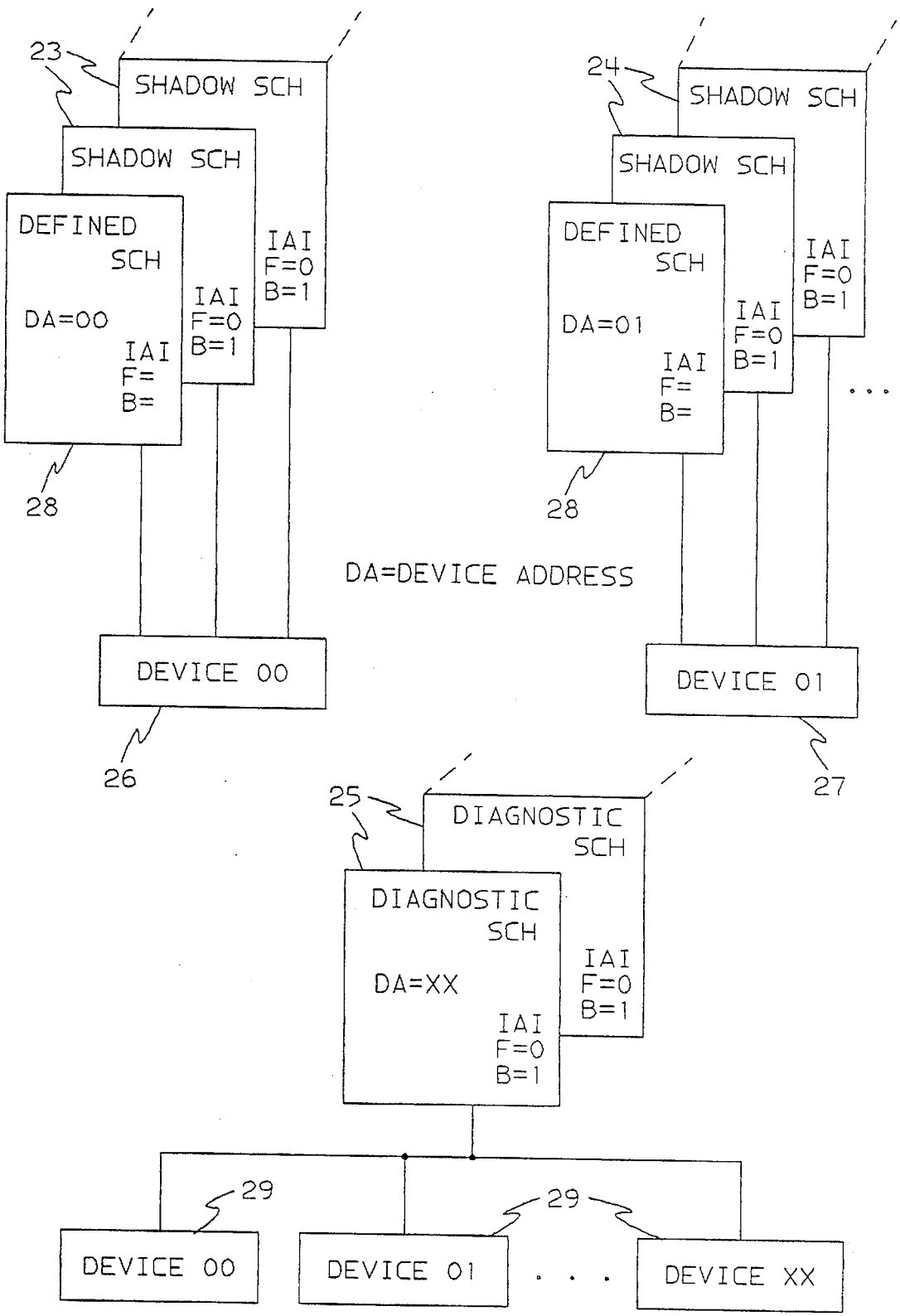

FIG. 2 depicts the iIOF subchannel structure. The shadow and diagnostic subchannels and their relationships to defined subchannels and the associated devices.

Figure 3:
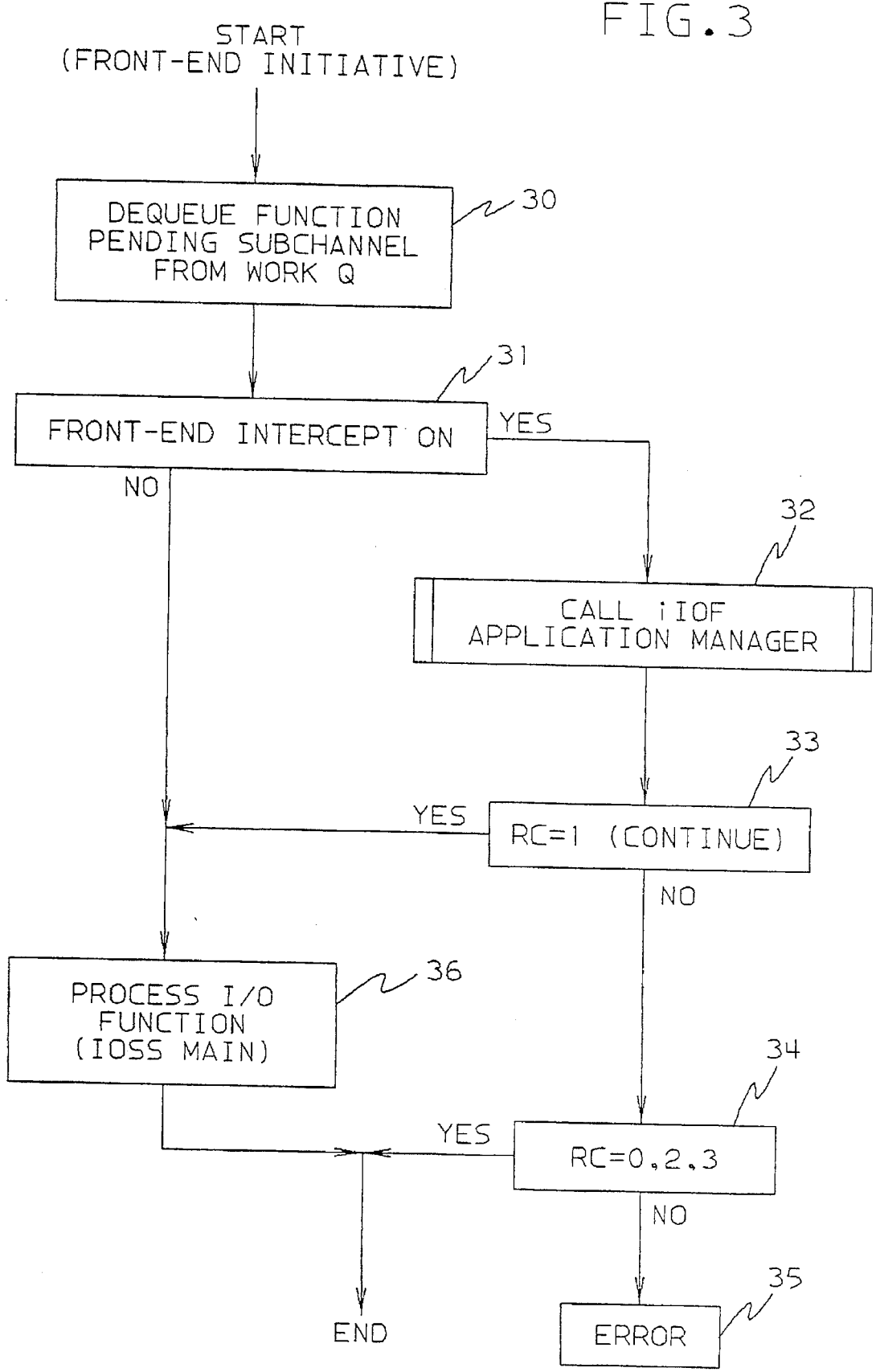

FIG. 3 shows the flow for the front-end process of the IOSS.

Figure 4:
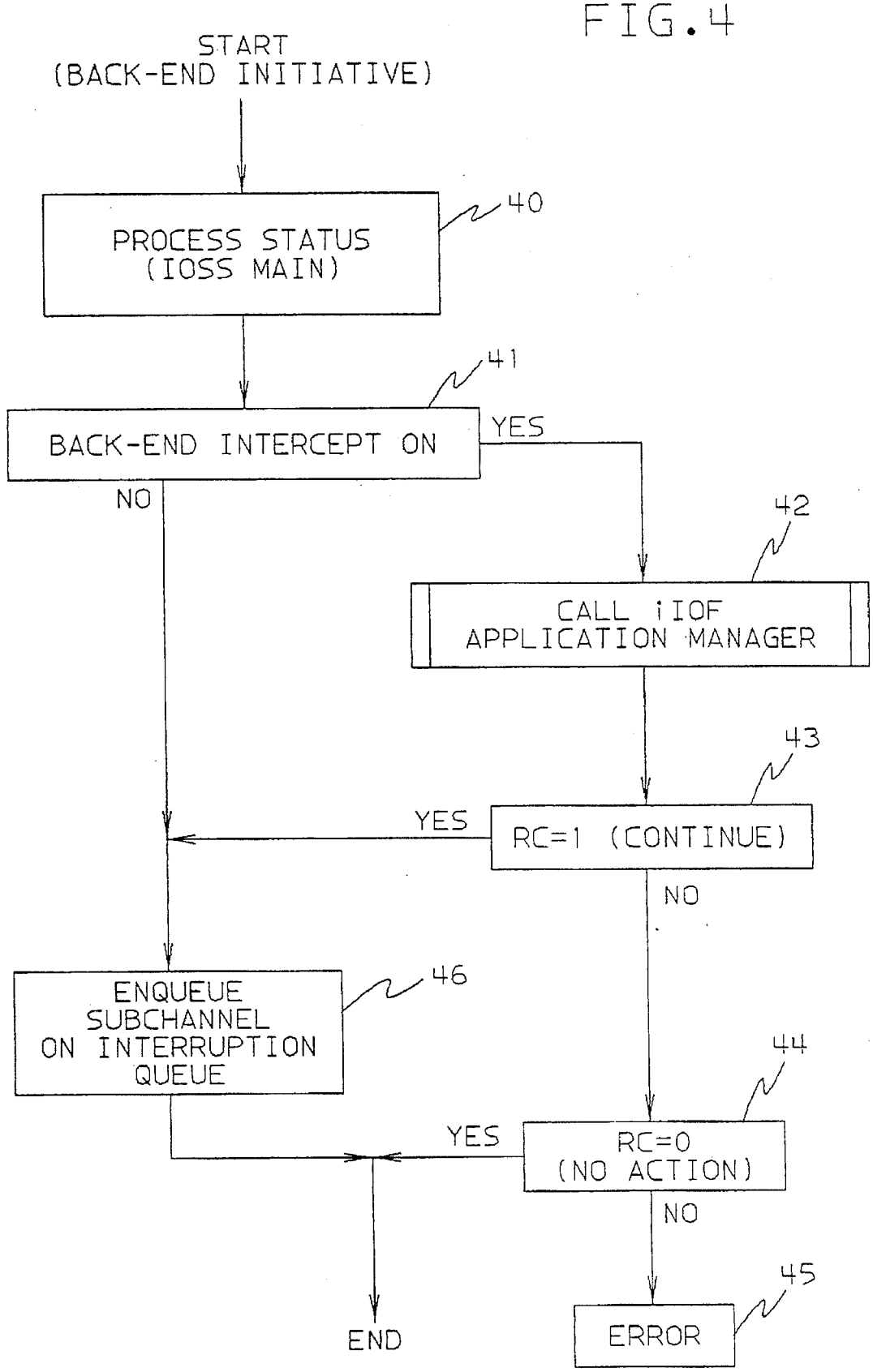

FIG. 4 shows the flow for the beck-end process of the IOSS.

Figure 5:
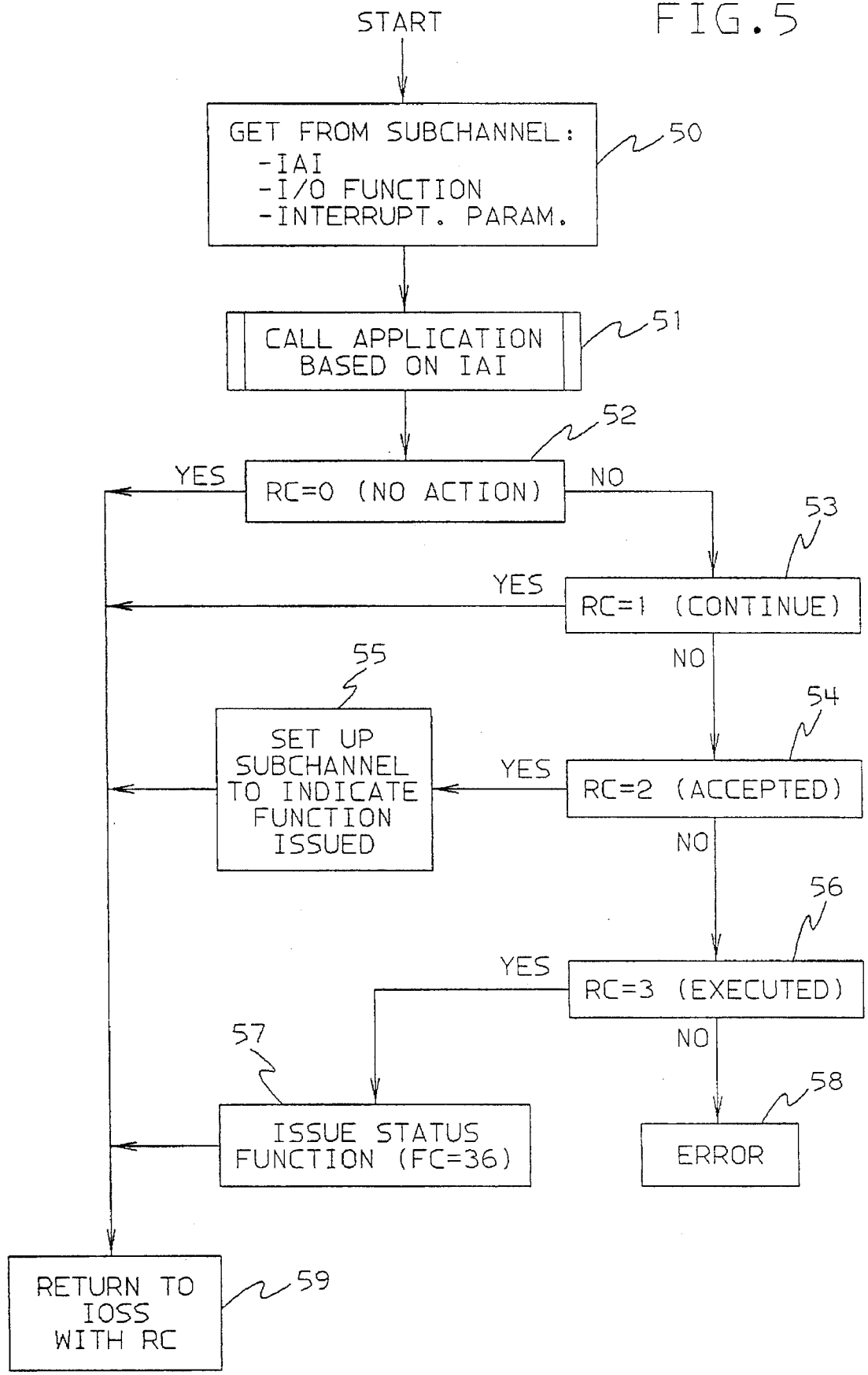

FIG. 5 shows the flow for the iIO Application Manager.

FIG. 6 displays the format and contents of the internal Operation Request Block. This control block is used by the start function.

FIG. 7 displays the format and contents of the internal Interruption Response Block. This control block is used by the test and status functions.

FIG. 8 displays the format and contents of the internal Subchannel Information Block. This control block is used by the store and modify functions.

FIG. 9 shows the fields within the internal Sub-channel Information Block that are modifiable for diagnostic subchannels. Blank fields and reserved fields indicated with 0s are not modifiable.

FIG. 10 shows the fields within the internal Sub-channel Information Block that are modifiable for idle shadow subchannels. Blank fields and reserved fields indicated with 0s are not modifiable.

Figure 11:
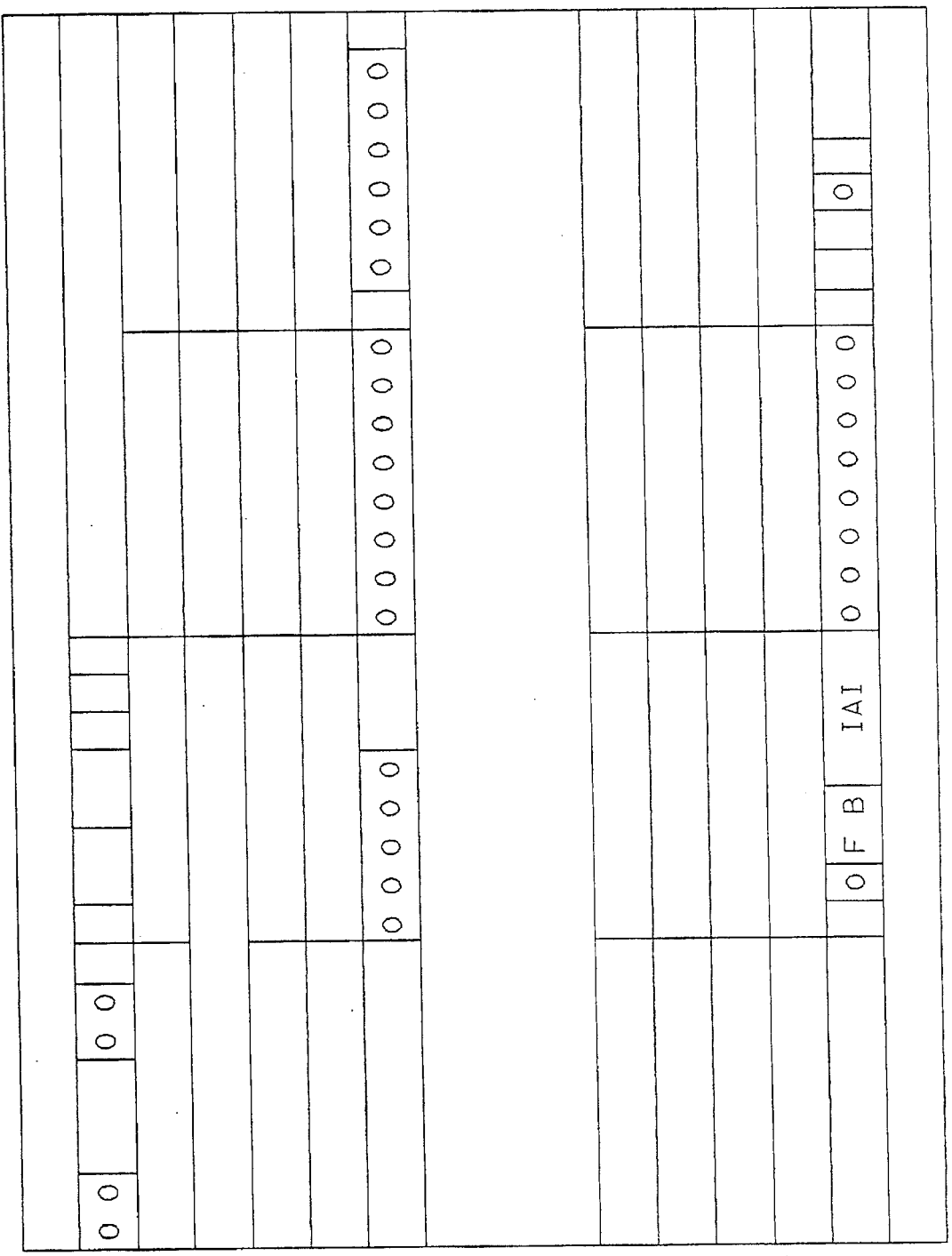

FIG. 11 shows the fields within the internal Sub-channel Information Block that are modifiable for non-idle subchannels and subchannels that are visible to the SCP. Blank fields and reserved fields indicated with 0s are not modifiable, FIG. 12 shows the format and contents of the two operands for the reserve work area function. This includes the origin and size of the requested work area.

FIG. 13 shows the format and contents of the operand for the Read iIOF Info function. Information about the iIOF is returned to the internal application executing the function.

Figure 14:
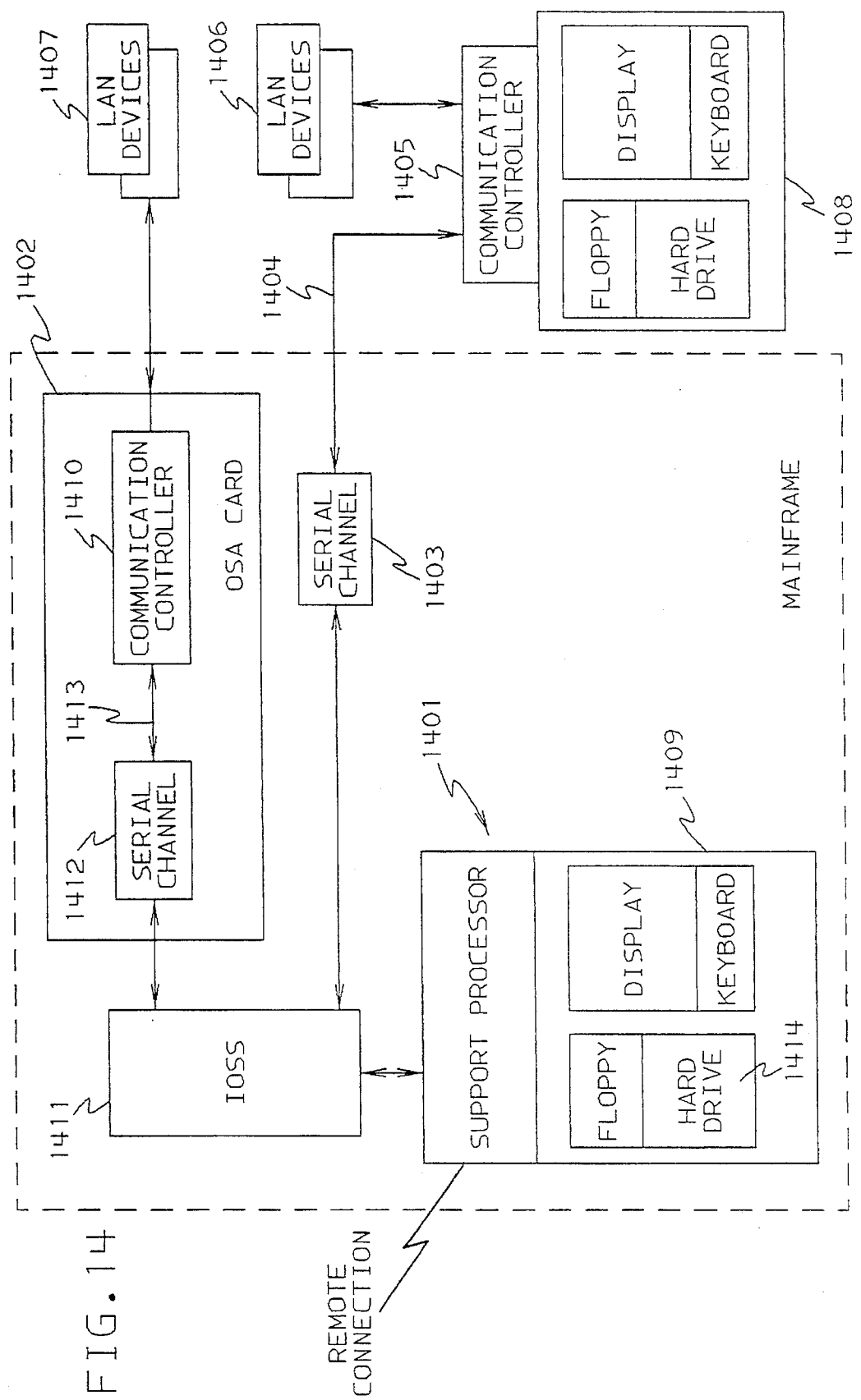

FIG. 14 shows the major functional elements of a Mainframe with a Serial Channel connected over a fiber to a Communications Controller contrasted to an OSA Card connected directly to a LAN.

Figure 15:
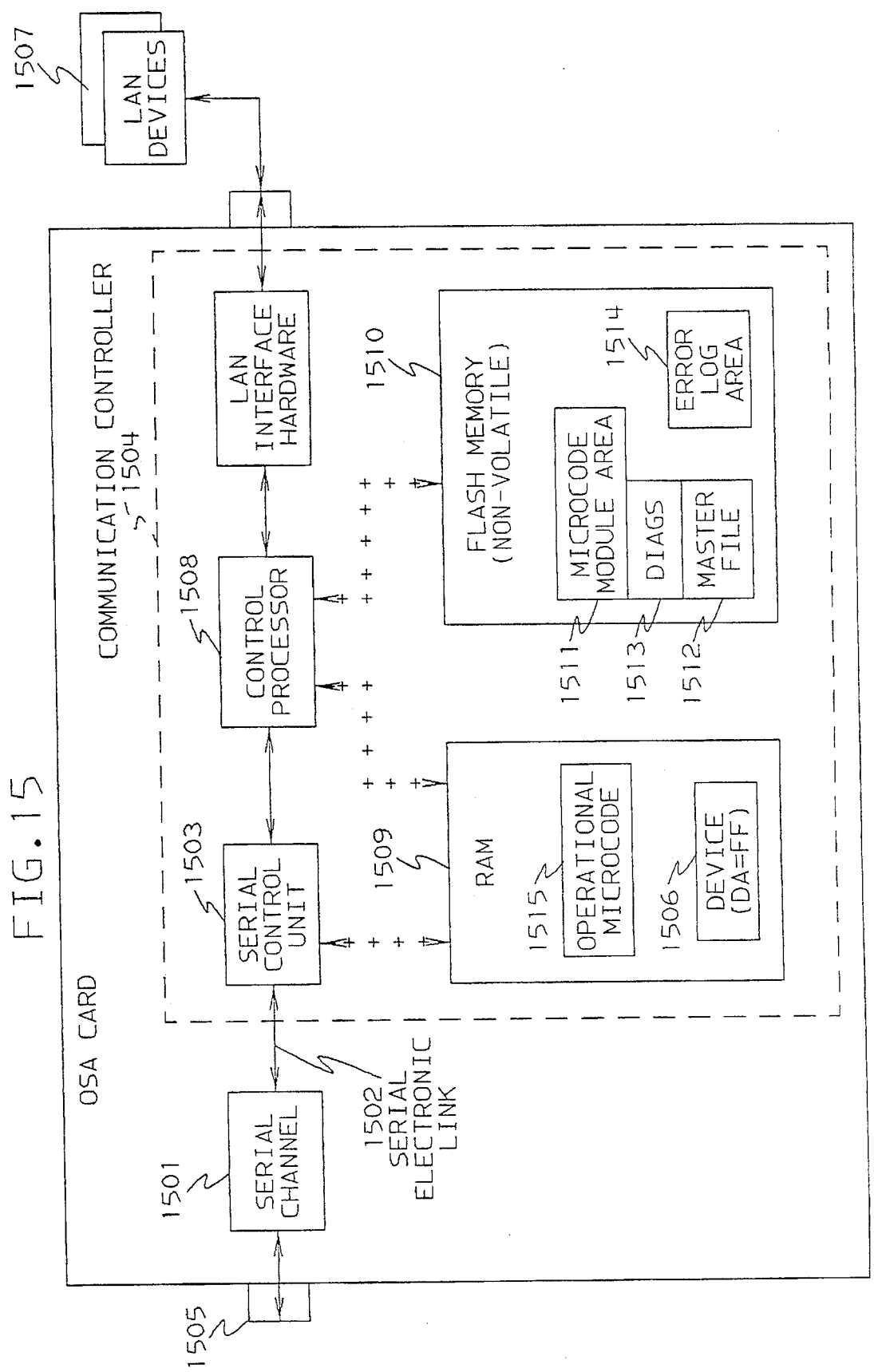

FIG. 15 shows the major functional elements on the OSA Card: Serial Channel, Control Unit, Serial link, Flash Memory, RAM, OSA Service Device and other components.

Figure 16:
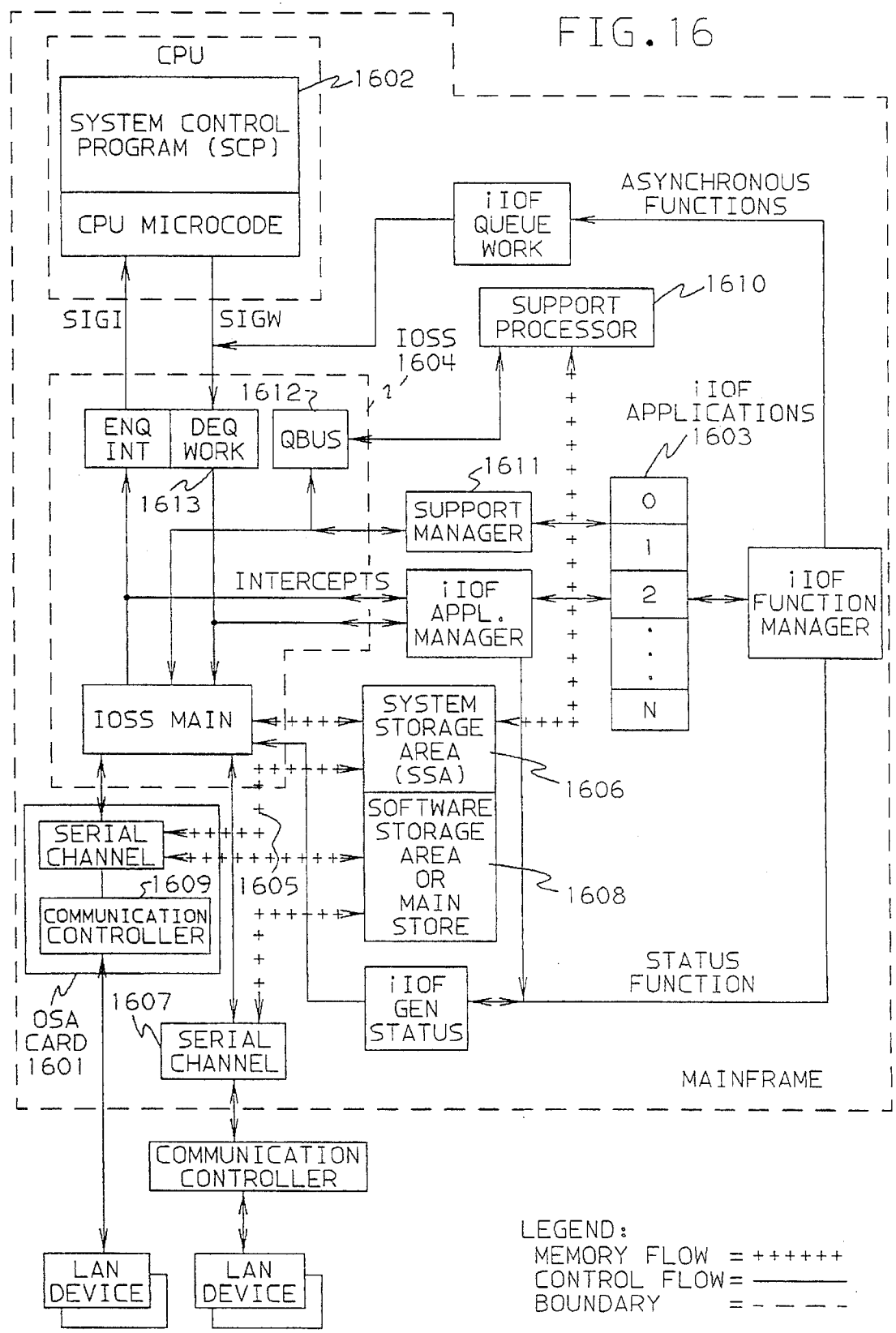

FIG. 16 is a representation of the iIOF showing the functional elements and flow of the facility. In addition, more detail with regards to the Support Processor (SP) interface has been shown. The OSA card, memory flows and Support Manager have also been added.

Figure 17:
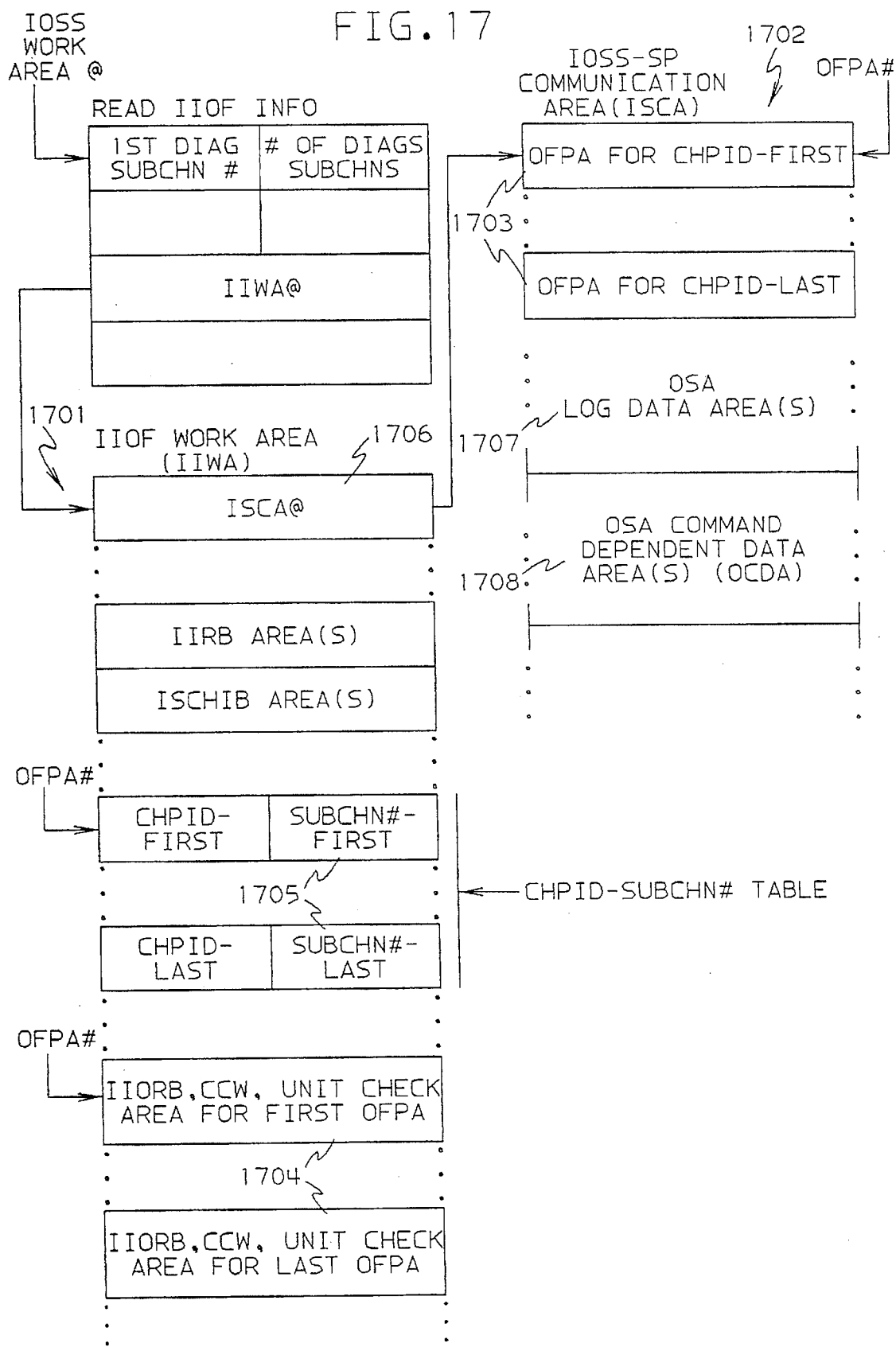

FIG. 17 shows memory areas in System Storage needed to support the OSA internal Application (OSA/IA) embodiment.

FIG. 18 is a map of the OSA Function Parameter Area (OFPA) that is one of the interfaces between the OSA/IA and the SP.

FIG. 19 is a map of the Additional Parameters needed for the Service Function: Alter OSA Memory. Alter can be used to update RAM and FLASH on the OSA Card.

FIG. 20 is a map of the Additional Parameters needed for the Service Function: Display OSA Memory. Display can be used to transfer RAM and FLASH data into the Mainframe System Storage Area.

Figures 21, 24:
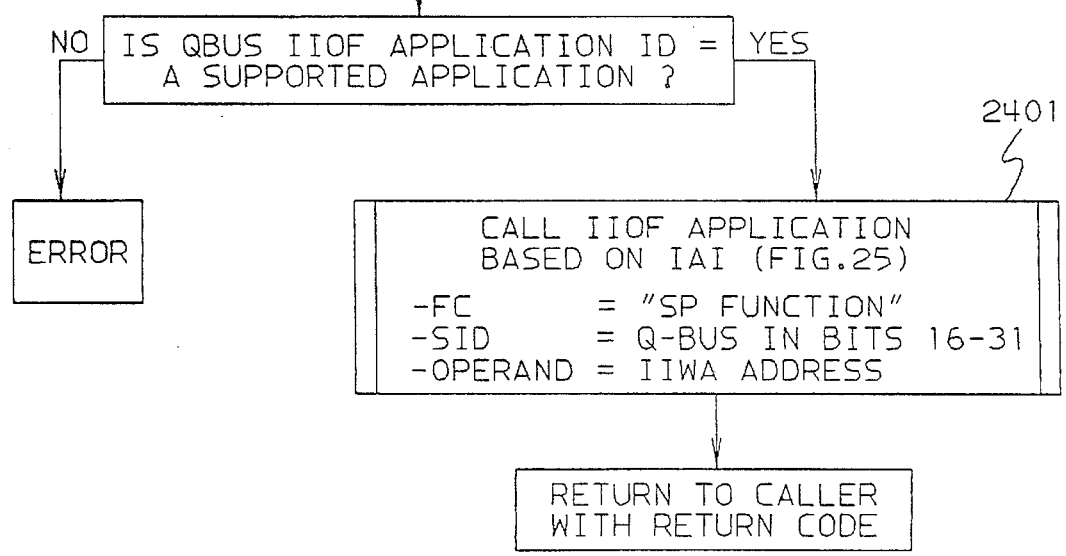

FIG. 21 is a map of the Additional Parameters needed for the Service Function: Set Port Enable/Disable. This function allows for communication to either occur (enable) or stop (disable) on an OSA port.

FIG. 22 is a flow diagram showing the transfer of control among the various system elements for handling a Support Processor initiated OSA Service Function request.

Figure 23:
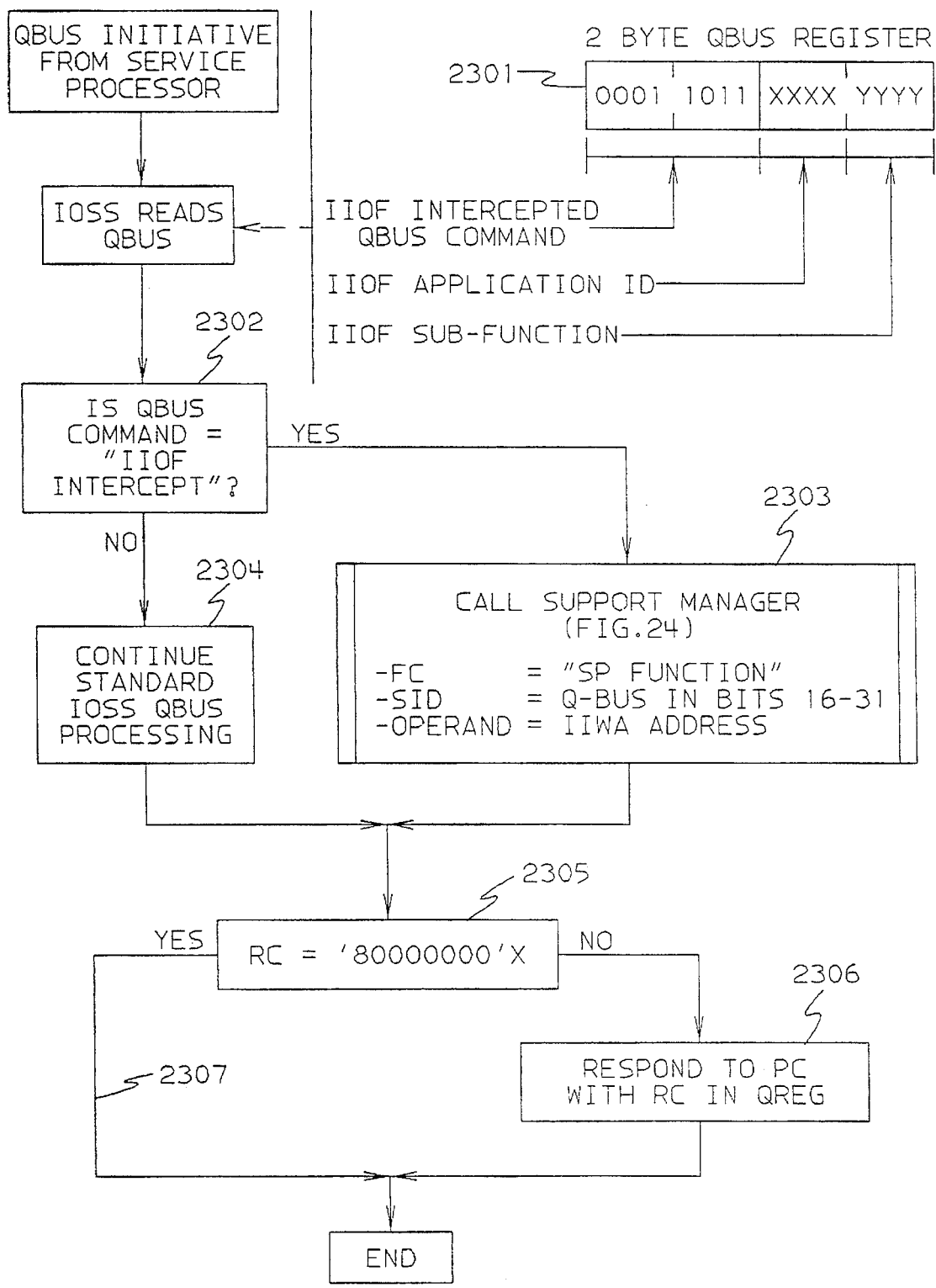

FIG. 23 is a flow chart showing the processing needed in the IOSS to invoke the Support Manager.

FIG. 24 is a flow chart showing the Support Manager call to a Support Processor application.

FIG. 25 is a flow chart showing the OSA/IA (OSA iIOF Application).

Figure 26:
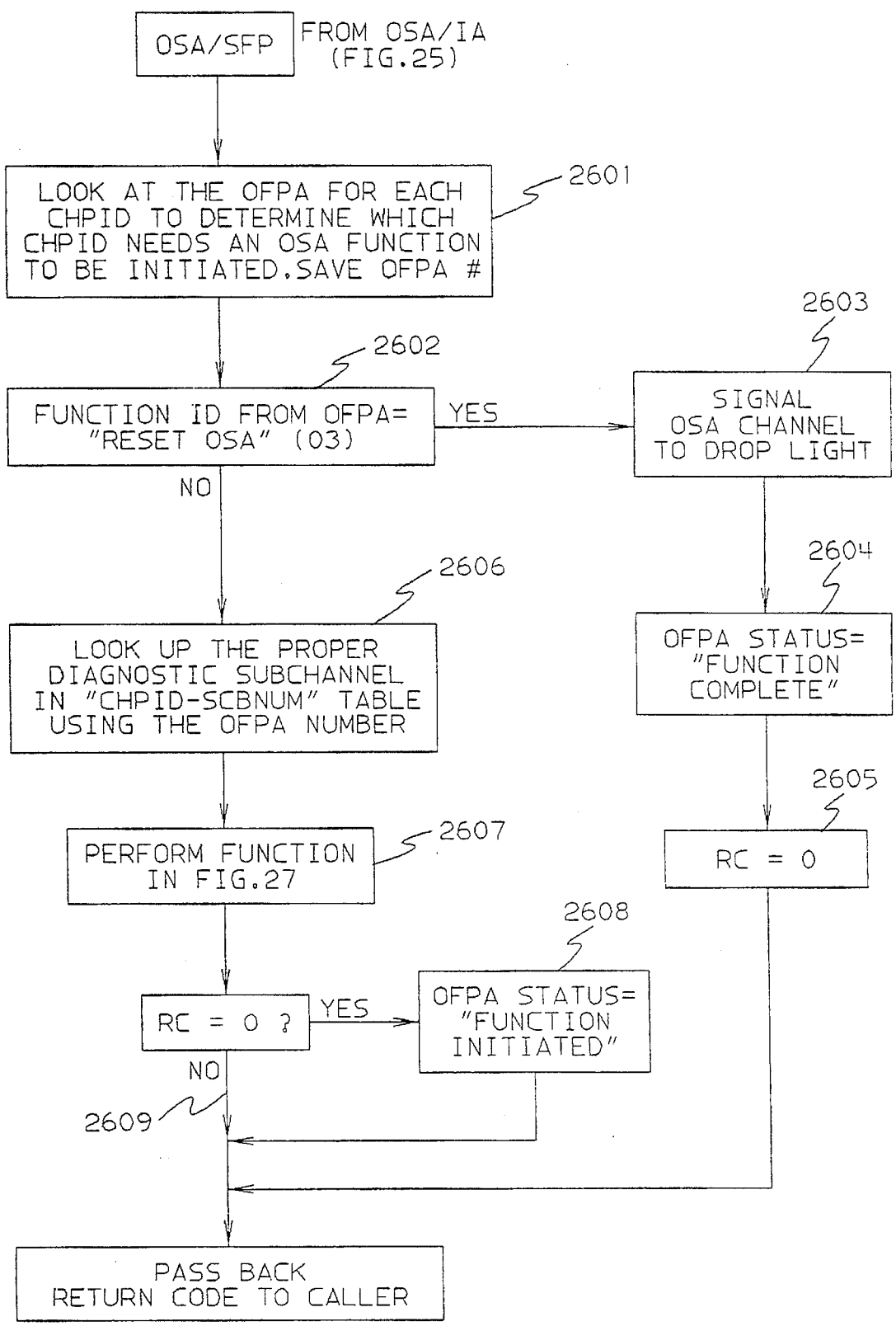

FIG. 26 is a flow chart showing the OSA Service Function Process (OSA/SFP). A request from the Support Processor (SP) will get processed here.

Figure 27:
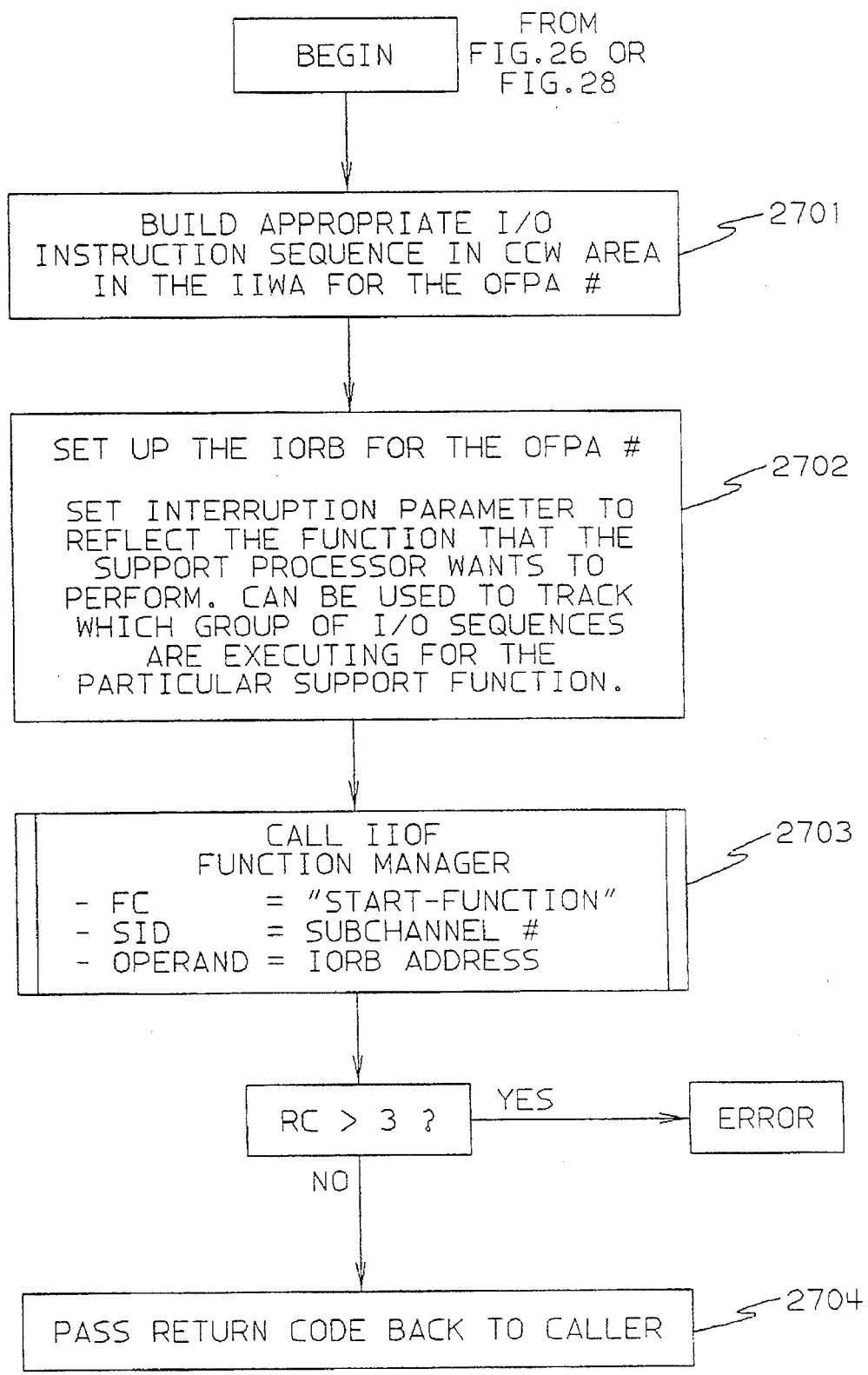

FIG. 27 is a flow chart showing how a Start Subchannel (SSCH) using the Start-Function is initiated.

Figure 28:
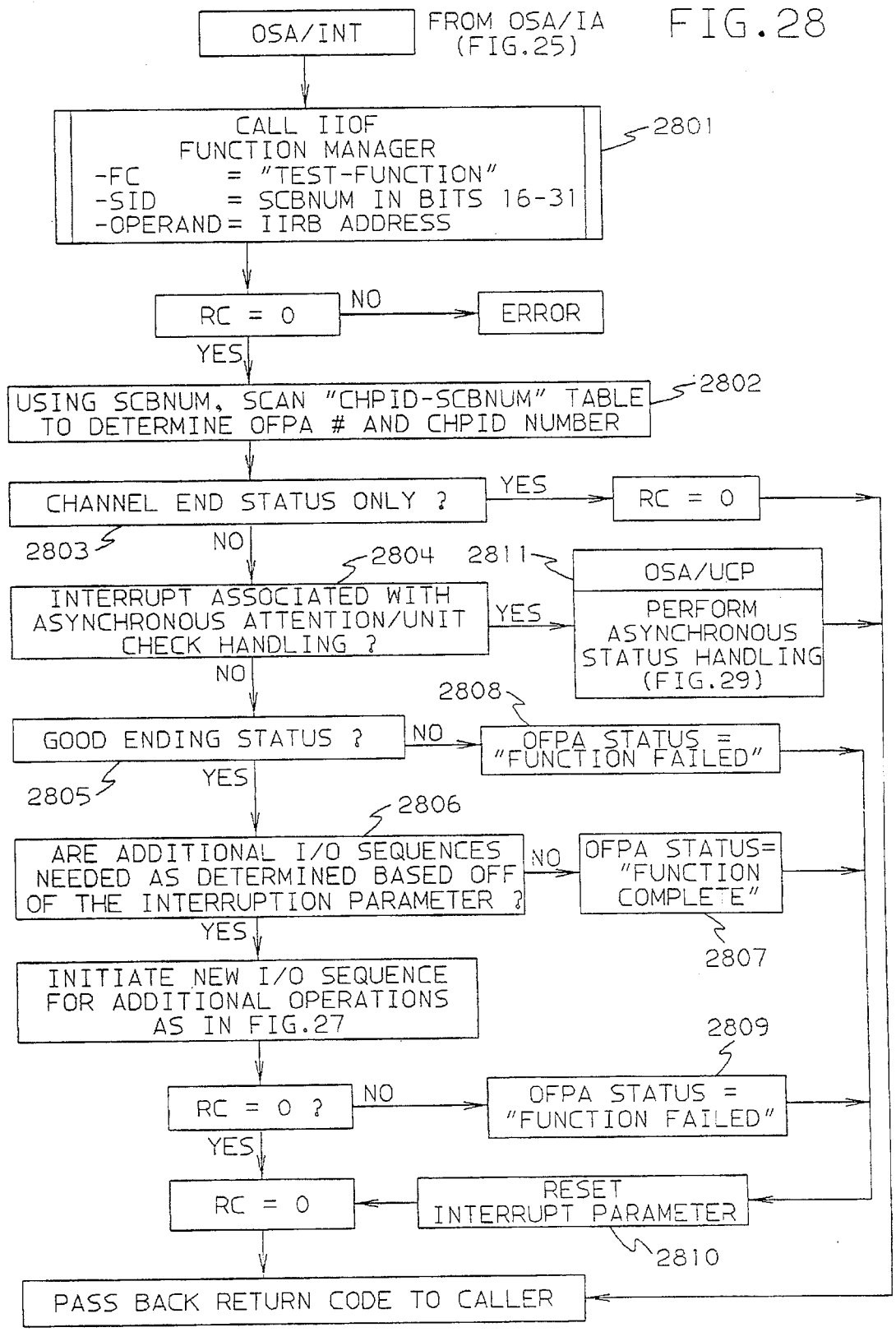

FIG. 28 is a flow chart showing how the back end interrupt Status-Function is processed for a Diagnostic subchannel for the OSA internal Application.

Figure 29:
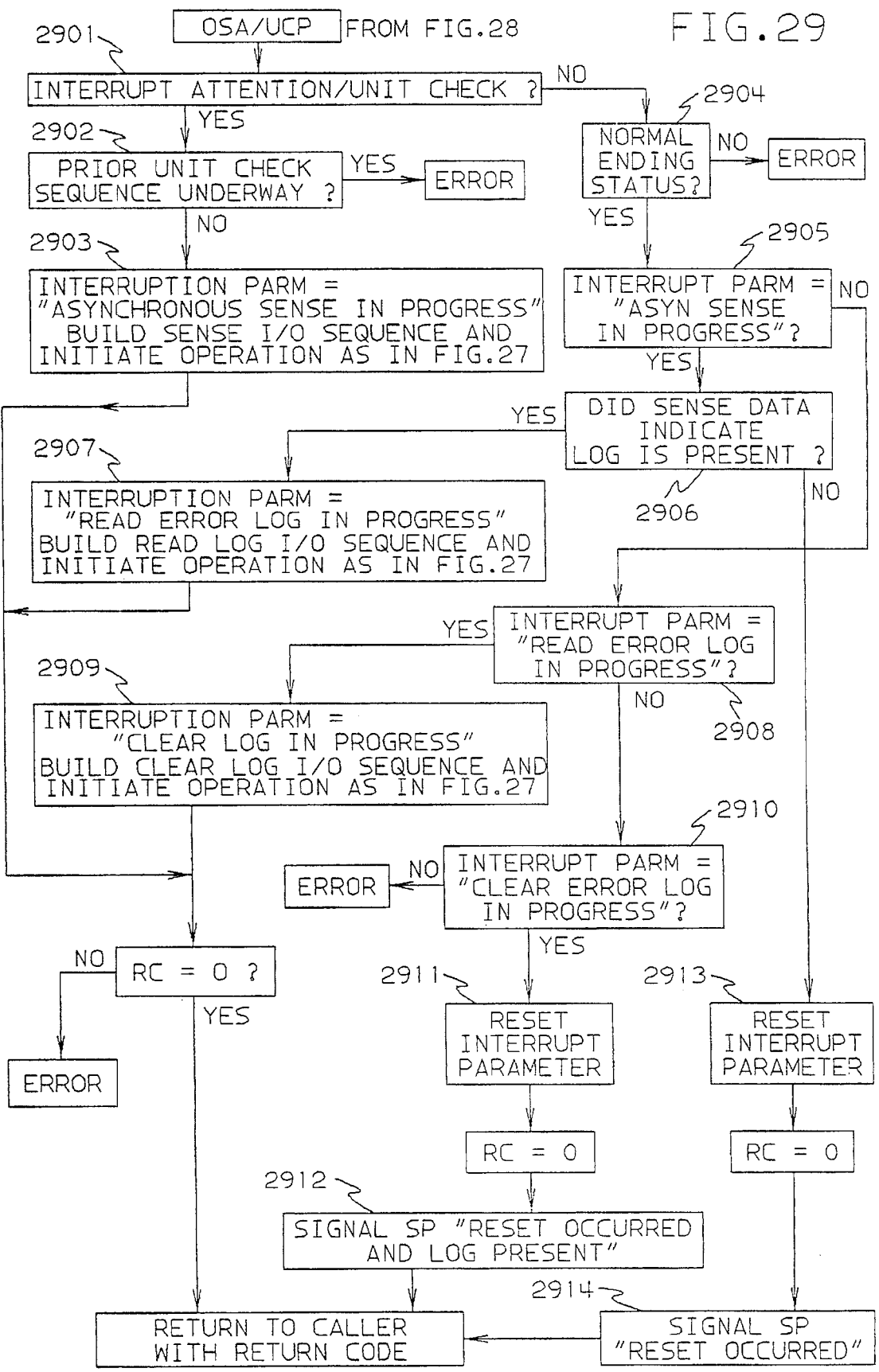

FIG. 29 is a flow chart showing OSA Attention/Unit Checks processing (OSA/UCP).

Figure 30:
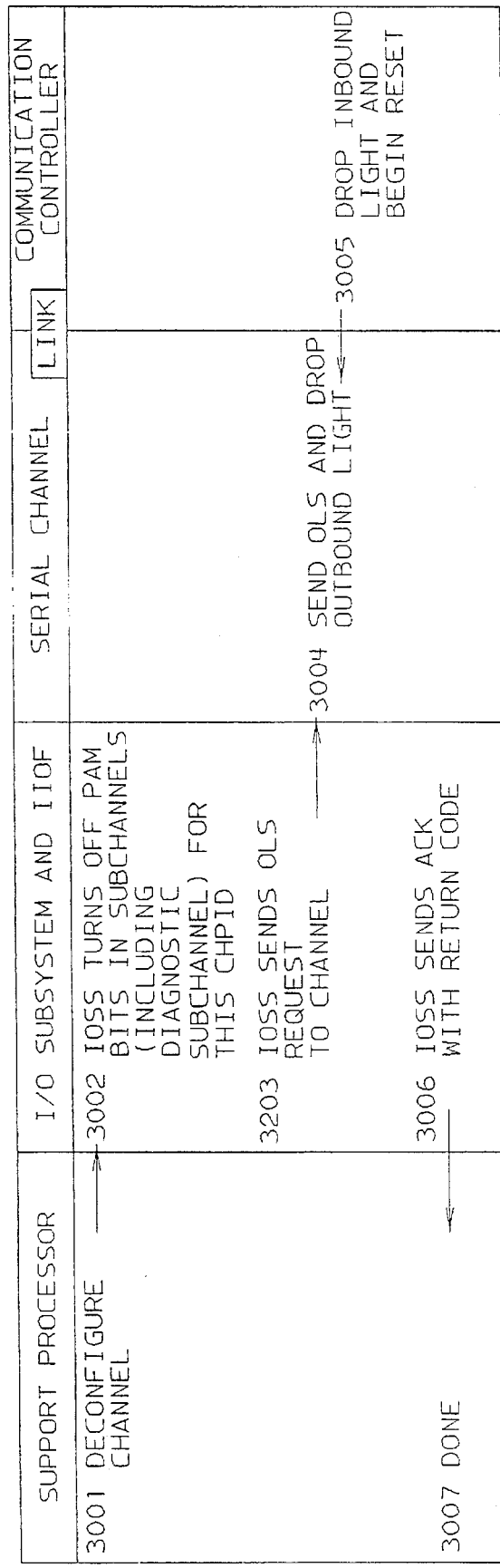

FIG. 30 is a flow diagram showing the transfer of control among the various system elements for handling Deconfigure Channel Path.

Figure 31:
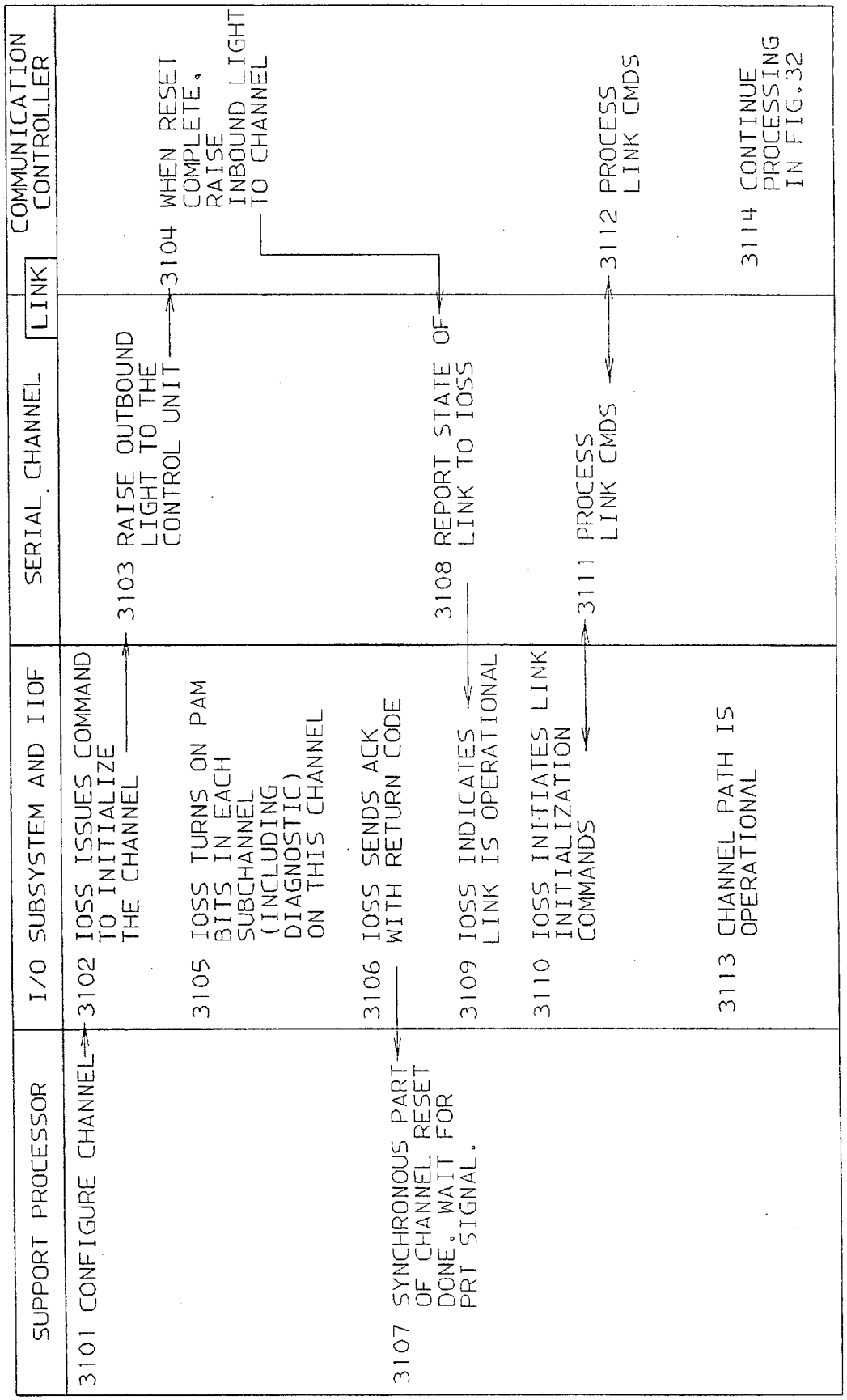

FIG. 31 is a flow diagram showing the transfer of control among the various system elements for handling Configure Channel Path.

Figure 32:
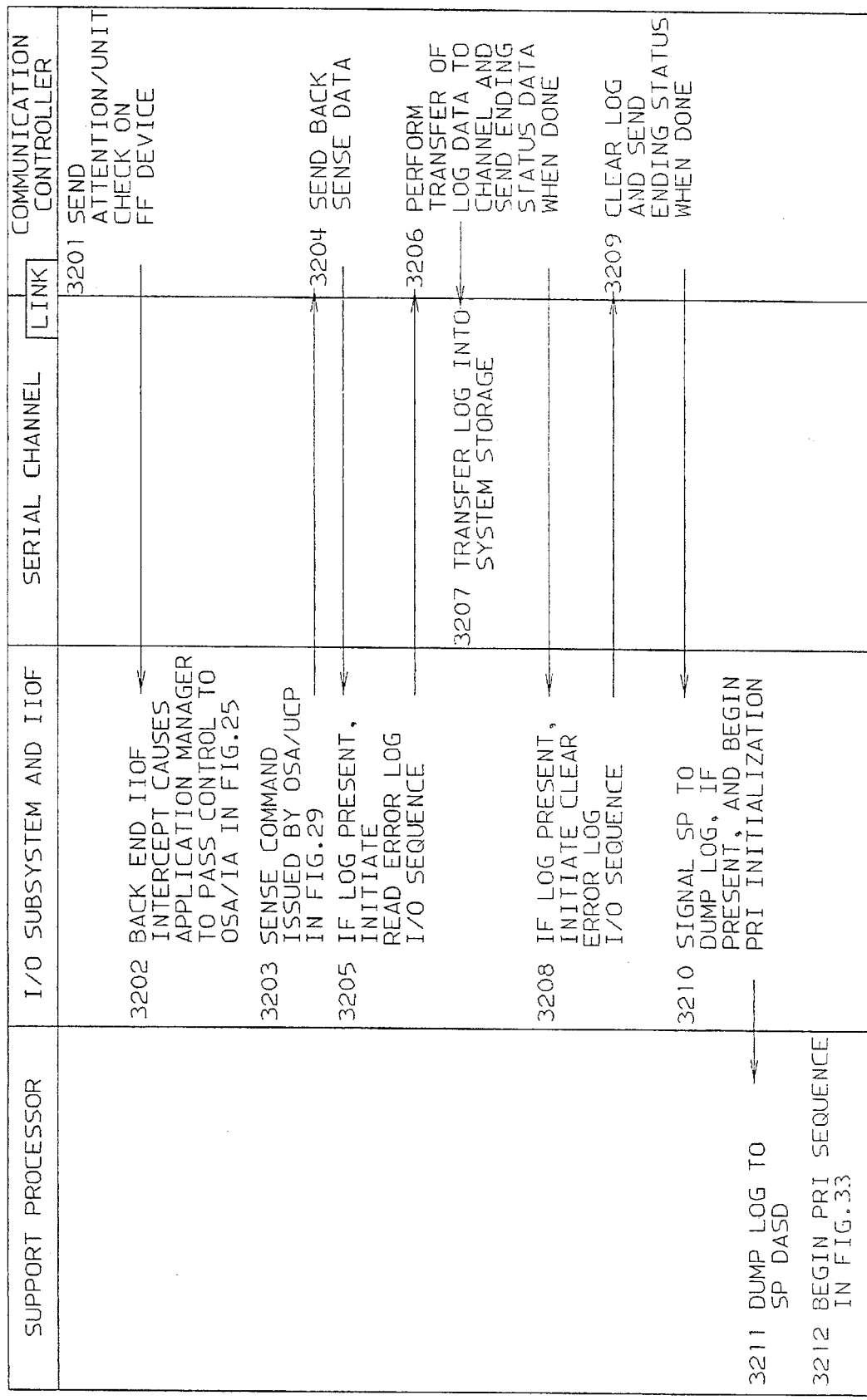

FIG. 32 is a flow diagram showing the transfer of control among the various system elements for handling an Attention/Unit Check on the OSA Service Device subchannel.

FIG. 33 is a flow diagram showing the transfer of control among the various system elements during the OSA Post Reset Initialization (PRI) Sequence.

FIG. 34 is a flow diagram showing the transfer of control among the various system elements during an OSA detected error.

FIG. 35 is a flow diagram showing the transfer of control among the various system elements during an OSA Force Log.

Figure 36:
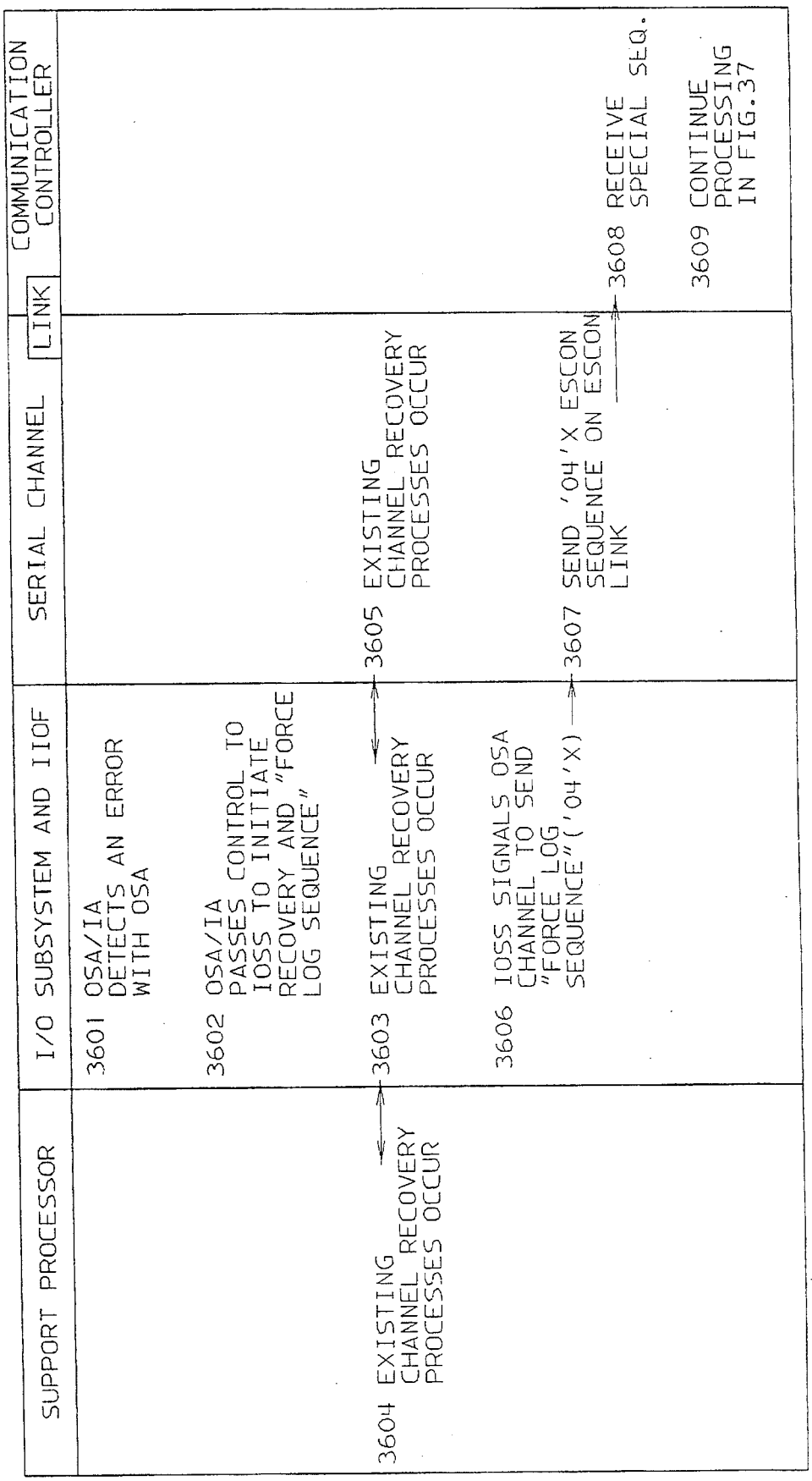

FIG. 36 is a flow diagram showing the transfer of control among the various system elements during an OSA internal Application detected error.

Figure 37:
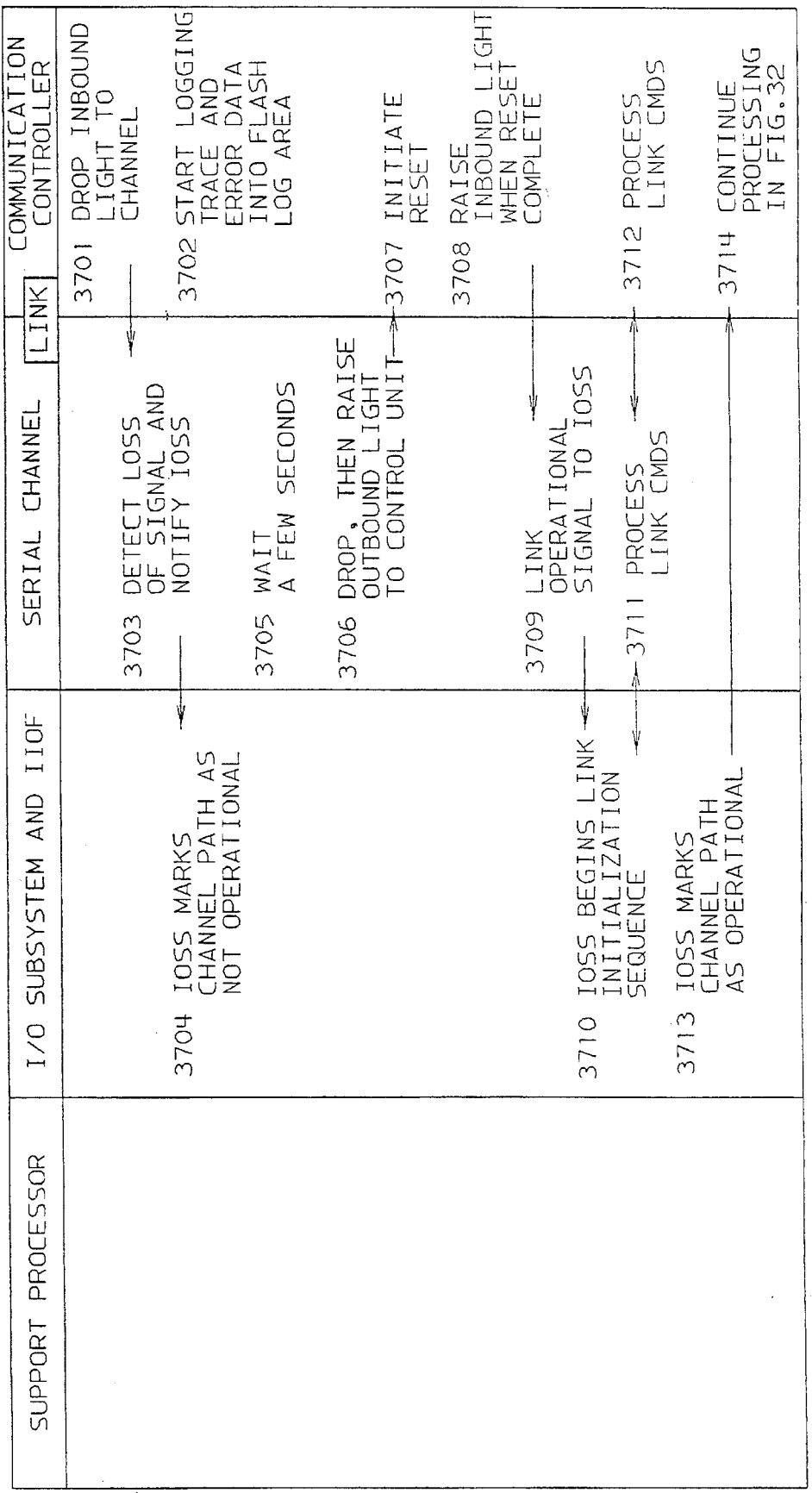

FIG. 37 is a flow diagram showing the transfer of control and signaling among the various system elements during an OSA recovery caused by either a Force OSA log request, OSA Detected error or OSA/IA detected error.

Figure 38:
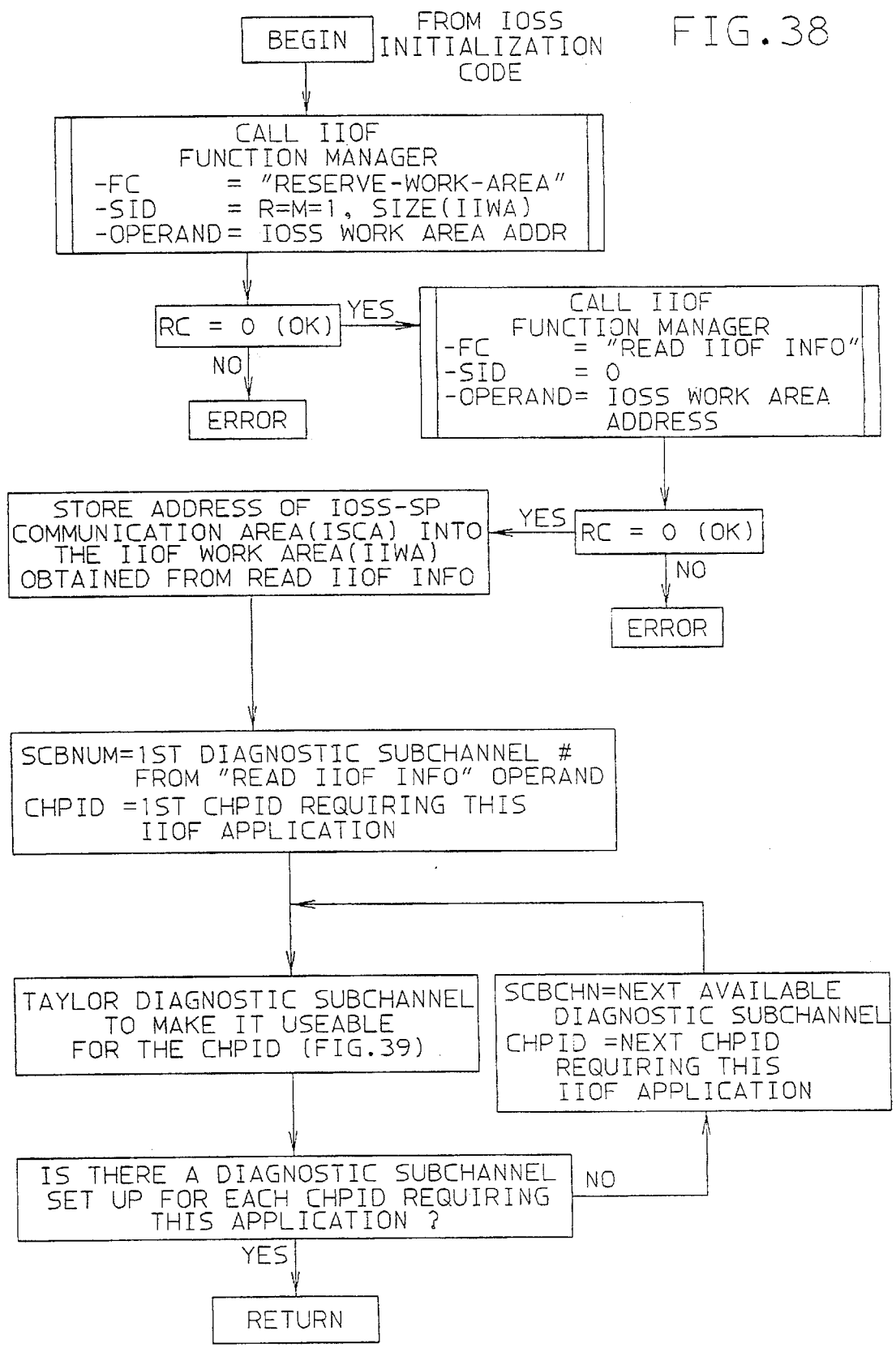

FIG. 38 is a flow chart showing basic initialization of the OSA/IA required when the Mainframe is initialized.

Figure 39:
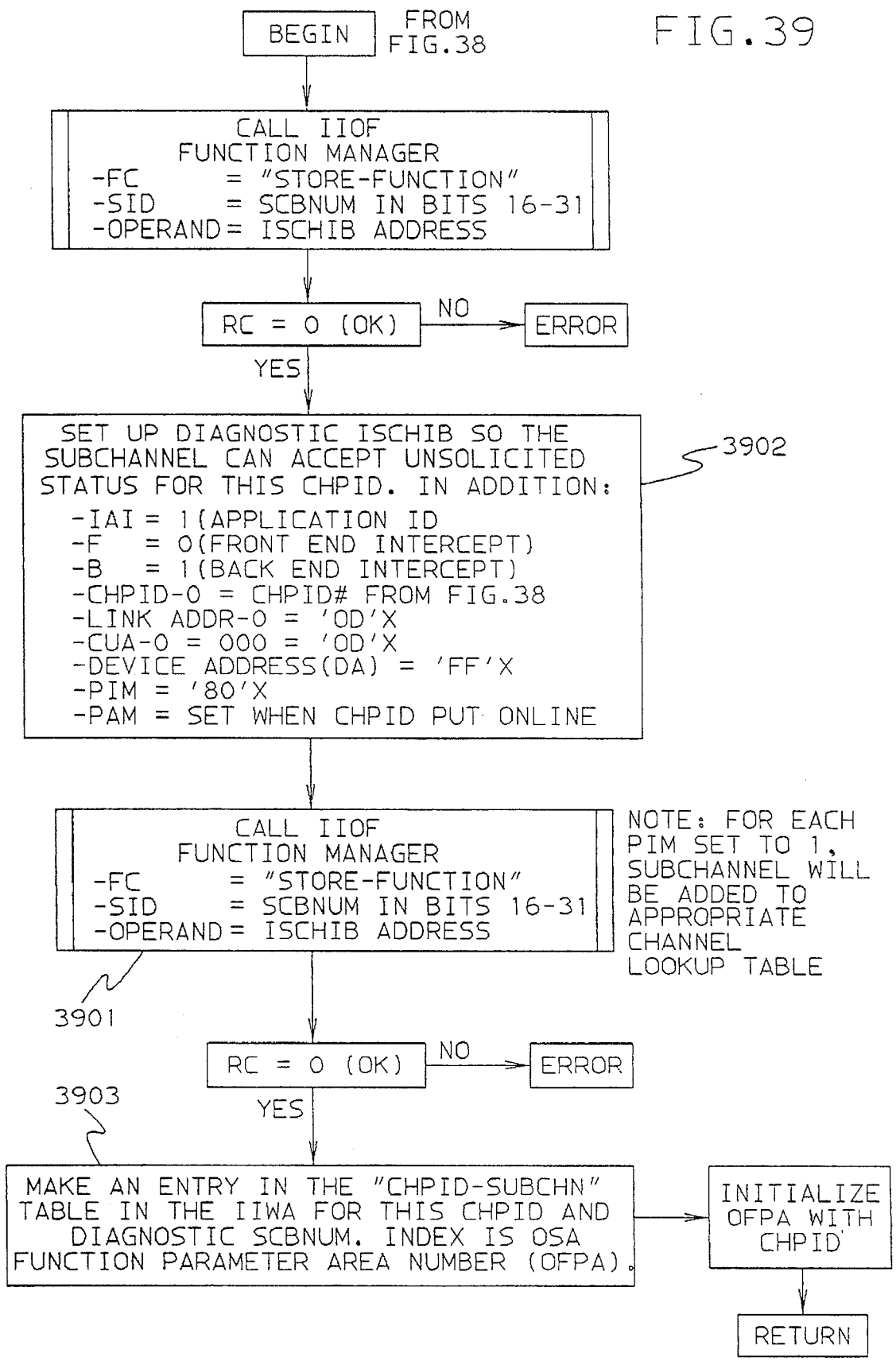

FIG. 39 is a flow chart showing basic initialization of a Diagnostic subchannel as it applies to the OSA/IA.

DETAILED DESCRIPTION OF EMBODIMENTS

The embodiment next described of the Internal I/O Facility is shown in FIGS. 1 through 13. It consists of the following for a data processing system in a CEC (central electronic complex) supporting the IBM ESA/390 architecture.

The preferred embodiment of the Internal I/O Facility consists of the following for a system supporting the ESA/390 architecture.

IIOF FUNCTION FLOW

Figure 1:
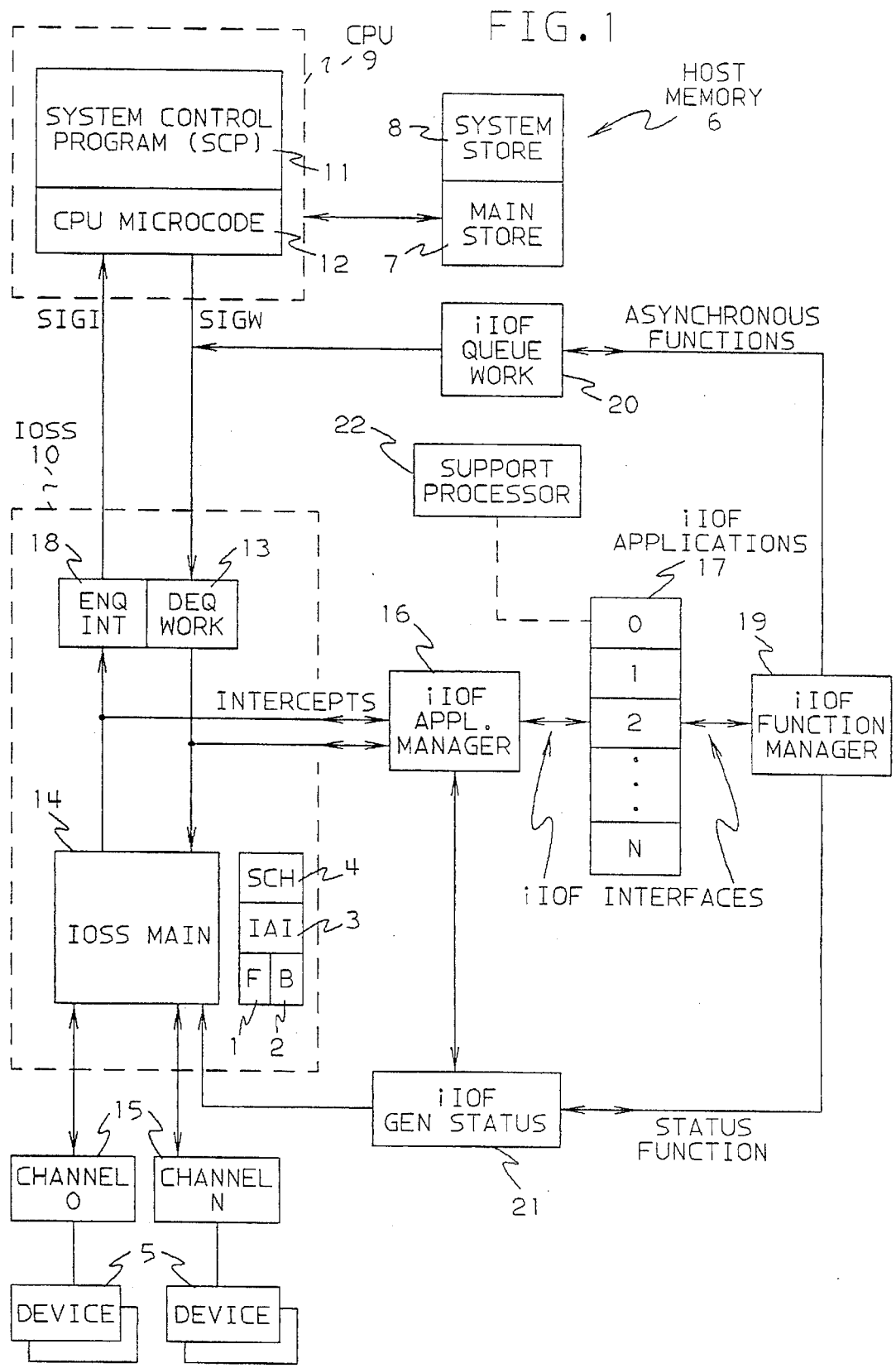
FIG. 1 is a representation of the iIOF facility showing the functional elements and flow of the facility and the relationship to the rest of the system.

FIG. 1 is a pictorial representation of the iIO Facility and where it fits within the IOSS structure 10. The intercepts occur within the IOSS 10. In order to show where they occur, the IOSS has been portrayed in three sections. These are: the process that dequeues new work from the work queue 13, the process that enqueues status pending subchannels on the interruption queues 18 and the IOSS MAIN 14.

Within the CPU 22, the SCP 11 executes I/O instructions which are interpreted by the CPU microcode 12. For asynchronous instructions, the microcode sets up the subchannel (SCH) 4, queues it on a work queue, and provides initiative for the IOSS 10 to look at the work queue; Signal Work—SIGW. Subsequently, if the SCH is not intercepted, the IOSS 10 dequeues the SCH from the work queue using the Dequeue Work process 13 and executes the I/O function pending in the SCH using the IOSS MAIN process 14. This may include dispatching the I/O function on a channel path 15.

If the SCH is to be intercepted as indicated by the Front-End Intercept bit (F) 1 in the SCH 4, the I/O function is not executed. Instead control is passed to the iIO Application Manager 16 and in turn to the appropriate iIOF application 17 as indicated by the iIOF Application ID (IAI) 3. Both the F bit 1 and the IAI 3 are initialized by the iIOF application wishing to intercept.

When a channel program completes and the device 5 presents ending status to the channel 15, the channel provides initiative for the IOSS MAIN 14 to update the state of the SCH 4 and make it status pending. If the SCH is not intercepted the SCH is queued on an interruption queue using the Enqueue Interruption process 18 and an I/O interruption is signaled to the CPU 9; Signal Interruption—SIGI. Subsequently, the I/O interruption is detected by the CPU microcode 12, accepted by the SCP 11 and the status is cleared from the SCH 4.

If the SCH 4 is to be intercepted as indicated by the Back-End Intercept bit (B) 2 in the SCH 4, the SCH is not queued on the interruption queue. Instead control is passed to the iIO Application Manager 16 and in turn to the appropriate iIOF application 17 as indicated by the iIOF Application ID (IAI) 3. Both the B bit 2 and the IAI 3 are initialized by the iIOF application wishing to intercept.

The iIO Application Manager 16 determines which application to call by using the iIOF Application ID (IAI) 3 in the SCH 4. Once an iIOF application 17 is invoked, it is capable of requesting any of the functions available within the iIO Function Manager 19. via the function CALL interface. iIOF control functions are executed entirely within the iIO Function Manager. For functions that emulate asynchronous I/O instructions, the Queue Work process 20 is used. This process closely resembles the function provided by the CPU microcode 12 for I/O instructions since the iIOF interface is very much like the ESA/390 I/O architecture. For the start, resume, halt and clear functions, the SCH 4 is queued on the work queue as if an instruction had been issued by the SCP 11.

For the Status Function, the Gen Status process 21 is used. This process emulates the channel 15. The status information provided by the iIOF application 17 is stored in the SCH and initiative is provided for the IOSS MAIN 14. The status can either be initial status when called by the iIO Application Manager 16 or ending status when called by the iIO Function Manager 19.

When an iIOF application 17 has completed its task it returns to the iIO Application Manager 16 with a return code to indicate what action is to be performed with the SCH that caused the interception. If the return code indicates that the function causing the interception has been executed by the application, the Gen Status process 21 is used to set up the SCH and provide initiative for the IOSS MAIN 14.

As is shown in FIG. 1, the iIOF applications can also be invoked from the Support Processor 22 independent of the iIO Application Manager 16. In this case, the application can also request any of the iIOF functions as described above.

IIOF WORK AREAS

Each iIOF application requires a work area within main storage 7 or the system store 8 in order to build channel programs and allocate data buffers. The work areas must be accessible by the channels 15 when executing these channel programs, but should be protected from any access by the SCP 11 or user programs and their channel programs. For work areas in main store, a mechanism must exist to provide this protection. This mechanism is outside the scope of this invention. Work areas in the system store are already protected. The System store is not accessible by the user programs or the SCP. It is also not normally accessible by the channel for executing channel programs or reading and writing data unless given authority. An iIOF application may be assigned a segment of the system store for its own use. The channel is then instructed to use the authorization mechanism when executing channel programs on behalf of the iIOF application.

IIOF INTERCEPTS

Two intercepts are provided in the IOSS that causes control to be passed to an iIOF application. The first intercept occurs during front-end processing when a subchannel is function pending prior to initiating the I/O function. The second occurs during back-end processing when a subchannel is status pending prior to making the subchannel interruption pending. The intercept causes the IOSS to call the iIO Application Manager 16. The iIO Application Manager in turn calls the appropriate iIOF application 17 based on the iIOF Application ID 3 in the SCH 4.

In order to provide an interface that is as general as possible, these intercepts provide the iIOF application with the subchannel number identifying the SCH causing the intercept. Subsequently, iIOF functions are used by the iIOF application to extract information from the SCH 4.

The CALL interface from the iIO Application Manager 16 to the iIOF application 17 contains three parameters, the Function Code, the Subsystem Identification word (SID) and the Interruption Parameter. The first parameter specifies the function that is pending in the SCH 4. When a SCH has multiple functions pending, the order of precedence is clear, halt, start and resume. Where applicable, the Function Code consists of the last two digits of the ESA/390 I/O Op Code for the corresponding instruction:

FC=30 Clear Function
FC=31 Halt Function
FC=33 Start Function
FC=36 Status Function
FC=38 Resume Function The remaining two parameters are the SID, containing the subchannel number in bits 16–31, and the Interruption Parameter from the subchannel causing the interception. This corresponds to the information provided in the I/O Interruption Code during an I/O interruption as described in "ESA/390 Principles of Operation:", chapter 16.

FRONT-END INTERCEPT

A Front-end intercept occurs after a SCH is dequeued from the work queue and the SCH is function pending, but prior to initiating the I/O function in the IOSS. Pending functions that cause an intercept are start, resume, halt, and clear. SCHs that are not function pending are not intercepted.

In FIG. 3 at 30 the IOSS 10 dequeues the function-pending SCH from the work queue. At 31 the SCH 4 is tested for the Front-End Intercept bit (F) 1. If this bit is one, the IOSS 10 calls the iIO Application Manager 16 at 32. If this bit is zero, normal processing continues at 36.

In FIG. 5 at 50 the iIO Application Manager 16 extracts the iIOF Application ID (IAI) 3, the pending function and the Interruption Parameter from the SCH 4 causing the interception. At 51, the iIOF application 17 based on the IAI 3 is called.

Subsequently, the iIOF application may extract additional information about the pending I/O function from the SCH by Using the Test- or Store-Function CALL. The application now performs its intended function by using any of the defined function calls. This is outside of the scope of this invention. The iIOF application 17 returns to the iIO Application Manager 16 with one of the following return codes:

RC=0 No-Action: In FIG. 5 at 52 the iIO Application Manager 16 tests for a return code of zero. If equal, control is passed back to the IOSS 10 along with the return code at 59. In FIG. 3 at 34 the IOSS 10 tests for a return code of 0, 2 or 3. If equal no further action on the SCH that caused the interception is performed.

RC=1 Continue: In FIG. 5 at 53 the iIO Application Manager 16 tests for a return code of one. If equal, control is passed back to the IOSS 10 along with the return code at 59. In FIG. 3 at 33 the IOSS 10 tests for a return code of 1. If equal The IOSS 10 continues normal I/O function processing at 36 as if the SCH that caused the interception is not associated with the iIO Facility.

RC=2 Function Accepted: In FIG. 5 at 54 the iioAM, 16 tests for a return code of two. If equal the iIO Application Manager 16 sets up the SCH as if a function was dispatched to a real channel at 55. Control is then passed back to the IOSS 10 along with the return code at 59. In FIG. 3 at 34 the IOSS 10 tests for a return code of 0, 2 or 3. If equal no further action on the SCH that caused the interception is performed.

For example, this return code is equivalent to the IOSS having sent a start command to a real channel, but not having received a response. This return code is required if a Status-Function CALL was executed for the SCH that caused the interception.

RC=3 Function Executed: In FIG. 5 at 56 the iioAM, 16 tests for a return code of three. If equal the iIO Application Manager 16 calls the Gen Status process 21 at 57 to set up the subchannel as if the function was performed by a real channel and if required, establish initiative for the IOSS 10 to process the result. In FIG. 3 at 34 the IOSS 10 tests for a return code of 0, 2 or 3. If equal no further action on the SCH that caused the interception is performed.

For example, this return code is equivalent to the IOSS having sent a start command to a real channel and having received a response that indicated that the first command had been accepted by the device.

If the return code is not 0, 1 2 or 3, an error is recognized in FIG. 5 at 58 and in FIG. 3 at 35.

BACK-END INTERCEPT

The Back-end intercept occurs after a SCH 4 is made status pending, but prior to making the SCH interruption pending. At this time all information related to the status pending condition is in the SCH. Events such as busy conditions, suspensions when the Suppress Suspended Interruption Control is one, and any other events that do not cause the SCH to be made status pending are not intercepted.

In FIG. 4 at 40 the IOSS 10 processes status information presented by a channel 15 or by the Gen Status process 21. Prior to enqueuing the SCH on the interruption queue, the IOSS 10 tests the SCH for the Back-end Intercept bit (B) 2 at 41. If this bit is one, the IOSS 10 calls the iIO Application Manager 16 at 42. If this bit is zero, normal processing continues at 46 by enqueuing the SCH on the interruption queue.

In FIG. 5 at 50 the iIO Application Manager 16 extracts the iIOF Application ID (IAI) 3, the pending function and the Interruption Parameter from the SCH 4 causing the interception. At 51, the application 17 based on the IAI 3 is called.

Subsequently, the iIOF application may extract additional information about the status pending condition from the SCH by using the Test—or Store—Function CALL. The Test-Function will cause the status to be cleared from the SCH. The Store-Function allows the application to look at the status without clearing it. The application now performs its intended function by using any of the defined function calls. This is outside of the scope of this invention.

The iIOF application 17 returns to the iIO Application Manager 16 with one of the following return codes:

In order to use the iIOF function CALLs, an understanding of the ESA/390 I/O architecture is required as described in "ESA/390 Principles of Operation", chapters 13 through 16. This specification does not include information already provided in the referenced document. Descriptions are provided when the iIOF function differs from the corresponding I/O instruction.

The iIOF function CALLs are received by the iIO Function Manager 19 through a single CALL interface. Three parameters are passed in the CALL, the Function Code, the Subsystem Identification Word (SID) and the Operand Address. The Function Code is always required. For those functions that emulate I/O instructions, the Function Code is equal to the last two digits of the ESA/390 instruction Op Code:

FC=30 Clear-Function
FC=31 Halt-Function
FC=32 Modify-Function
FC=33 Start-Function
FC=34 Store-Function
FC=35 Test-Function
FC=36 Status-Function
FC=37 Queue-Function
FC=38 Resume-Function
FC=F1 Reserve-Work-Area
FC=F2 Release-Work-Area
FC=F3 Read iIOF Information
FC=F4 Configure Channel Path RC=0 No-Action: In FIG. 5 at 52 the iIO Application Manager 16 tests for a return code of zero. If equal, control is passed back to the IOSS 10 along with the return code at 59. In FIG. 4 at 44 the IOSS 10 tests for a return code of 0. If equal no further action on the SCH that caused the interception is performed.

RC=1 Continue: In FIG. 5 at 53 the iIO Application Manager 16 tests for a return code of one. If equal, control is passed back to the IOSS 10 along with the return code at 59. In FIG. 4 at 43 the IOSS 10 tests for a return code of 1. If equal The IOSS 10 continues normal status processing at 46 as if the SCH that caused the interception is not associated with the iIO Facility.

If the return code is not 0 or 1, an error is recognized in FIG. 5 at 58 and in FIG. 4 at 45.

IIOF FUNCTION CALLS

The iIO Facility provides a set of function CALLs in order to start, terminate and control I/O functions within the IOSS. Most of the functions are modeled after, but not restricted to, existing ESA/390 I/O instructions. In order to provide an interface that is as general as possible, these functions have the same interface as the corresponding I/O instructions. For example, in ESA/390 architecture, the Start Subchannel instruction uses an Operation Request Block (ORB) to pass information such as the channel program address to the IOSS. Similarly, the iIOF Start-Function uses an internal ORB (iORB) to pass the same information to the IOSS. Conditions codes are also returned as if an I/O instruction was executed.

The SID is required for all iIOF functions that address a SCH. It is a full word consisting of the value '0001'x in bytes 0 and 1 and the subchannel number in bytes 2 and 3. This parameter corresponds to an implied operand in GPR 1 for the corresponding I/O instructions. When the SID is not applicable for the function, it is ignored.

The Operand Address is used for those functions that require a control block to be accessed such as the iORB for the Start-Function. The Operand Address is an absolute address which must be within the work areas reserved for iIOF applications and must be on a word boundary. Access exceptions do not occur. When the Operand Address is not applicable for the function, it is ignored.

For those functions that emulate I/O instructions, the return codes 0 through 3 are equivalent to the condition code settings for the corresponding instructions. However, not all condition codes for any given function are necessarily applicable. Additional return codes are used to indicate errors that would have caused program exceptions if an I/O instruction had been executed:

RC=4 Operand exception
RC=5 Specification exception
RC=6 Operation exception

An operand exception occurs when bits 0–15 of the SID do not contain '0001'x or when the operand designated by the Operand Address does not contain the proper format. A specification exception occurs when the Operand Address does not designate a word boundary.

An operation exception occurs when an undefined Function Code is specified.

Start-Function

The iIOF Start-Function emulates the SSCH instruction in ESA/390. The iIO Function Manager 19 checks the input parameters and if conditions allow, calls the Queue Work process 20 to set up the start function and queue the SCH 4 on an IOSS work queue. The function manager returns to the iIOF application with a return code indicating the resulting condition code. The Start-Function is only valid for iIOF diagnostic and shadow subchannels that are not visible to the system control program.

All parameters are required for the Start-Function. The Function Code is '33'x and the SID contains the target subchannel number in bits 16–31. The Operand Address specifies the location of the Operation Request Block (iORB). FIG. 6 shows the format of the iORB containing the information required for executing a channel program similar to the ORB described in ESA/390 architecture. The ORB is described in "ESA/390 Principles of Operation", chapter 15.

Required fields in the iORB are:
Key
CCW Format (F)
Logical Path Mask (LPM)
iORB Extension (X). This-bit must be set to one.
Channel Program Address (CPA)
Optional fields in the iORB are:
Interruption Parameter
Suspend Control (S)
Prefetch (P)
Initial Status Interruption Control (I)
Zone
Zone Relocation Control (R)
The iIO Facility does not support the following fields the ORB:
Address Limit Checking Control (A). Address limit checking is not compatible with zone relocation for any zone value other than zero.

Suppress Suspended Interruption Control (U). By suppressing a suspended interruption, an intercept is prevented when a subchannel is suspended.
I/O Interruption Subclass Code (ISC). Subclasses are not applicable to the iIO Facility.
I/O Interruption Subclass Control (C). Subclasses are not applicable to the iIO Facility.
Valid return codes are:
RC=0 (CC=0) Function initiated
RC=1 (CC=1) Status pending
RC=2 (CC=2) Busy
RC=3 (CC=3) Not operational
RC=4 Operand exception
RC=5 Specification exception Resume-Function The iIOF Resume-Function emulates the RSCH instruction in ESA/390. The iIO Function Manager 19 checks the input parameters and if conditions allow, calls the Queue Work process 20 to set up the resume function and queue the SCH 4 on an IOSS work queue. The function manager returns to the iIOF application with a return code indicating the resulting condition code. The Resume-Function is only valid for iIOF diagnostic and shadow subchannels that are not visible to the system control program.

Only the Function Code and the SID are required for the Resume-Function. The Function Code is '38'x and the SID contains the target subchannel number in bits 16–31. The Operand Address is ignored.

Valid return codes are:
RC=0 (CC=0) Function initiated
RC=1 (CC=1) Status pending
RC=2 (CC=2) Function not applicable
RC=3 (CC=3) Not operational
RC=4 Operand exception Halt-Function The iIOF Halt-Function emulates the HSCH instruction in ESA/390. The iIO Function Manager 19 checks the input parameters and if conditions allow, calls the Queue Work process 20 to set up the halt function and queue the SCH 4 on an IOSS work queue. The function manager returns to the iIOF application with a return code indicating the resulting condition code. The Halt-Function is only valid for iIOF diagnostic and shadow subchannels that are not visible to the system control program.

Only the Function Code and the SID are required for the Halt-Function. The Function Code is '31'x and the SID contains the target subchannel number in bits 16–31. The Operand Address is ignored.

Valid return codes are:
RC=0 (CC=0) Function initiated
RC=1 (CC=1) Status pending with other than intermediate status.
RC=2 (CC=2) Busy
RC=3 (CC=3) Not operational
RC=4 Operand exception Clear-Function The iIOF Clear-Function emulates the CSCH instruction in ESA/390. The iIO Function Manager 19 checks the input parameters and if conditions allow, calls the Queue Work process 20 to set up the clear function and queue the SCH 4 on an IOSS work queue. The function manager returns to the iIOF application with a return code indicating the resulting condition code. The Clear-Function is only valid for iIOF diagnostic and shadow subchannels that are not visible to the system control program.

Only the Function Code and the SID are required for the Clear-Function. The Function Code is '30'x and the SID contains the target subchannel number in bits 16–31. The Operand Address is ignored.

Valid return codes are:

RC=0 (CC=0) Function initiated

RC=3 (CC=3) Not operational

RC=4 Operand exception

Test-Function

The iIOF Test-Function emulates the TSCH instruction in ESA/390. The iIO Function Manager 19 checks the input parameters and if conditions allow, calls the Queue Work process 20 to store control and status information and clear the status from the SCH 4. The function manager returns to the iIOF application with a return code indicating the resulting condition code. The Test-Function is only valid for iIOF diagnostic and shadow subchannels that are not visible to the system control program.

Unlike the ESA/390 IRB, there is one case when the CCW Address in the iIRB is valid even though the SCH is not status pending. The CCW address is valid when the subchannel is start or resume pending. This allows the IIOF application to determine the channel program address when an intercept occurs for a start- or resume- pending SCH. All parameters are required for the Test-Function. The Function Code is '35'x and the SID contains the target subchannel number in bits 16–31. The Operand Address specifies the location of the Interruption Response Block (iIRB). FIG. 7 shows the format of the iIRB used to store the status and control information from the SCH similar to the IRB described in ESA/390 architecture. The IRB is described in "ESA/390 Principles of Operation", chapter 16.

Valid return codes are:

RC=1 (CC=1) iIRB stored (independent of status pending)

RC=3 (CC=3) Not operational

RC=4 Operand exception

RC=5 Specification exception

Store-Function

The iIOF Store-Function emulates the STSCH instruction in ESA/390. The iIO Function Manager 19 checks the input parameters and if conditions allow, calls the Queue Work process 20 to store control and status information from the SCH 4. The state of the SCH is not changed. The function manager returns to the iIOF application with a return code indicating the resulting condition code. The Store-Function is valid for all SCHs.

All parameters are required for the Store-Function. The Function Code is '34'x and the SID contains the target subchannel number in bits 16–31. The Operand Address specifies the location of the Subchannel Information Block (iSCHIB). FIG. 8 shows the format of the iSCHIB used to store the control and status information from the subchannel similar to the SCHIB described in ESA/390 architecture. Additional information is provided in the iSCHIB unique to the iIO Facility. This is described in the iIOF Control Block section. The SCHIB is described in "ESA/390 Principles of Operation", chapter 15.

Valid return codes are:

RC=0 (CC=0) iSCHIB stored

RC=3 (CC=3) Not operational

RC=4 Operand exception

RC=5 Specification exception

Modify-Function

The iIOF Modify-Function emulates the MSCH instruction in ESA/390. The iIO Function Manager 19 checks the input parameters and if conditions allow, calls the Work Queue process 20 to place the modifiable information in the SCH 4. The function manager returns to the iIOF application with a return code indicating the resulting condition code. The Modify-Function is valid for all SCHs.

A SCH may be modified only when the iIOF Application ID (IAI) in the iSCHIB is equal to the same field (IAI) 3 in the SCH 4 or when that field in the SCH is zero.

All parameters are required for the Modify-Function.

The Function Code is '32'x and the SID contains the target subchannel number in bits 16–31. The Operand Address specifies the location of the Subchannel Information Block (iSCHIB). FIG. 8 shows the format of the iSCHIB used to provide the information to be modified in the SCH similar to the SCHIB described in ESA/390 architecture. Additional information is provided in the iSCHIB unique to the iIO Facility. This is described in the iIOF Control Block section. The SCHIB is described in "ESA/390 Principles of Operation", chapter 15.

Valid return codes are:

RC=0 (CC=0) iSCHIB information placed in SCH

RC=1 (CC=1) Status pending; iIOF information placed in SCH

RC=2 (CC=2) Busy; IIOF information placed in SCH

RC=3 (CC=3) Not operational

RC=4 Operand exception

RC=5 Specification exception

Not all fields in the iSCHIB are modifiable and the fields that are modifiable are dependent on the type of SCH and the state of the SCH. For iIOF diagnostic subchannels that are idle (no function in progress and not status pending), the fields that may be modified are indicated in FIG. 9.

For iIOF shadow subchannels that are idle (no function in progress and not status pending), the fields that may be modified are indicated in FIG. 10.

For subchannels visible to the SCP or for diagnostic and shadow subchannels that are not idle (function in progress or status pending), only iIOF information may be modified as indicated in FIG. 11. Fields that are visible to the SCP can not be modified by the iIOF application.

Status-Function

The iIOF Status-Function causes the specified SCH to be made status pending and interruption pending to the SCP based on information provided by the iIOF application. The iIO Function Manager 19 checks the input parameters and if conditions allow, calls the Gen Status process 21 to set up the SCH 4 as if status information was presented by a real channel 15 and establishes initiative for the IOSS MAIN 14 to process the status. The function manager returns to the iIOF application with a return code indicating the results of the function. The Status-Function is valid for all subchannels.

All parameters are required for the Status-Function.

The Function Code is '36'x and the SID contains the target subchannel number in bits 16–31. The Operand Address specifies the location of the internal Interruption Response Block (iIRB). FIG. 7 shows the format of the iIRB used to set up the subchannel with status information. Word 0 of the iIRB is ignored.

Valid return codes are:

RC=0 (CC=0) Function initiated

RC=1 (CC=1) SCH already Status Pending

RC=3 (CC=3) Not operational

RC=4 Operand exception

RC=5 Specification exception

Queue-Function

The iIOF Queue-Function causes initiative to be reestablished for a SCH 4 that is function pending. Previously an application might have returned from a Front-end intercept with a return code specifying No-Action. The iIO Function Manager 19 checks the input parameters and if conditions allow, queues the SCH on an IOSS work queue. The function manager returns to the iIOF application with a return code indicating the results of the function. The Queue-Function is valid for all SCHs.

Only the Function Code and the SID are required for the Queue-Function. The Function Code is '37'x and the SID contains the target subchannel number in bits 16–31. The Operand Address is ignored.

Valid return codes are:

RC=0 (CC=0) Function initiated

RC=1 (CC=1) Status Pending

RC=2 (CC=2) Function not applicable

RC=3 (CC=3) Not operational

RC=4 Operand exception

Reserve-Work-Area

The iIOF Reserve-Work-Area function is is used by the iIOF application to reserve a work area for its own use and to determine the work area origin and size. In addition, the application can indicate if it wants to be notified of channel events: reset functions and/or channel-path related machine checks. The iIO Function Manager 19 checks the input parameters and if conditions allow, assigns a work area to the application and provides a work area origin and size. It also saves the state of the channel event notification flags. The function manager returns to the iIOF application with a return code indicating the results of the function.

All parameters are required for the Reserve-Work-Area function. The Function Code is 'F1' and the SID is used to specify the channel notification flags and the size in bytes of the work area requested. If no work area is required, zero is specified. With a successful return code and if a size greater than 0 is requested, the Operand Address contains the location of the work area origin and size. The size may be smaller than the size requested. The formats of the SID and the operand are shown in FIG. 12.

Valid return codes are:

RC=0 Function executed

RC=3 No work area available

RC=4 Operand exception (invalid format for the SID)

Release-Work-Area

The iIOF Release-Work-Area function is used by the iIOF application to free up its work area and make it available for another application. The iIO Function Manager 19 unassigns the work area. The function manager returns to the iIOF application with a return code indicating the results of the function. Only the Function Code is required for the Release-Work-Area function. The Function Code is 'F2'. The SID and the Operand Address are ignored.

Valid return codes are:

RC=0 Function executed

Read iIOF Info

The Read iIOF Information function provides the iIOF application with information about the iIO Facility. This information is required for setting up the SCHs reserved for iIOF use.

Only the Function Code and the Operand Address are required for the Read iIOF Info function. The Function Code is 'F3' and the Operand Address specifies the location of where the information is to be stored. The SID is ignored. The format of the operand is shown in FIG. 13.

Valid return codes are:

RC=0 Function executed

RC=4 Operand Exception

RC=5 Specification Exception

Configure Channel Path

The Configure Channel Path function is used to put the target channel 15 in a state where it is not visible to the SCP 11, but can be used by iIOF applications that require exclusive use of the channel path. Whenever any of the iIOF diagnostic subchannels are used to communicate with real devices, the channel path(s) must be in this state. Prior to using this function, the channel must be placed in the Standby (Offline) state using conventional manual means. The execution of this function causes the channel 15 to be configured back online from a hardware and IOSS 10 point of view. However, the channel will still appear as physically unavailable to the SCP. All the corresponding PAM bits in all the defined SCHs that have access to the channel will remain set to zero.

Architecturally, the channel will be placed in the Reserved State to prevent the channel from being configured back online to the SCP.

Only the Function Code and the SID are required for the Configure Channel Path function. The Function Code is 'F4'x and the SID contains the CHPID in bits 24–31 instead of the subchannel number. The Operand Address is ignored.

Valid return codes are:

RC=0 Function executed

RC=4 Operand Exception

RC=7 Channel path not in Standby

Unsupported Functions

I/O functions initiated by instructions that do not address subchannels and synchronous instructions are not provided by the iIO Facility.

A mix of data streaming and D.C. interlock on the same channel when using the iIOF diagnostic subchannels is not supported. If required, the protocol for all devices on the channel path could be indicated at the time the channel is configured for diagnostic use.

Address limit checking is incompatible with zone relocation and is therefor not supported for iIOF diagnostic and shadow subchannels.

I/O interruption subclasses are not applicable to the iIO Facility and are therefor not supported for iIOF diagnostic and shadow subchannels.

A suspended interruption cannot be suppressed for iIOF diagnostic and shadow subchannels since that will prevent an interception from occurring.

CHANNEL EVENT NOTIFICATION

There are certain events in the IOSS that may cause normal I/O operations to be effected on channel paths that are being used by the iIOF applications. If an application requires knowledge about these events, it may request that it be informed each time one of these events occurs. The request is made at the time the application reserves a work area for itself (see "Reserve-Work-Area"). These events consist of the reset function and channel-path related machine checks.

They are intended to be informational only.

When a channel event occurs, it is treated just like an intercept. The iIO Application Manager is called by the IOSS which in turn calls all applications that have requested notification for the particular type of event. The application is called regardless of the CHPID for which the event occurred. It is up to the application to determine if the event will effect its internal controls or what recovery action is required.

For the reset function, the intercept occurs after condition code zero is set. In ESA/390, this means that the intercept occurs after the CPU can complete the reset instruction, but prior to initiating the reset function. For the machine check function, the intercept occurs during the generation of the machine check, but prior to presenting it to the SCP.

The function CALL interface from the iIO Application Manager to the iIOF application for the iIOF intercepts is also used for the notification of channel events. The Function codes are defined as follows:

FC=39 Machine Check
FC=3B Reset Function

For both the reset and the machine check functions, the SID contains the CHPID in bits 24–31 instead of the subchannel number. For the machine check function, the Interruption Parameter contains the Error Recovery Code (ERC) in bits 26–31. The ERC is defined in in "ESA/390 Principles of Operation", chapter 17.

Only one return code is permitted when the iIOF application returns to the iIO Application Manager:

RC=1 Continue: The IOSS continues normal processing of the reset function or the machine check.

IIOF CONTROL BLOCKS

The iIOF control blocks are internal versions of the same control blocks defined in ESA/390 I/O architecture. They are used by the iIOF function CALLs. Definitions for the fields already described in "ESA/390 Principles of Operation" are not repeated here. Fields that are defined for the iIO Facility are described below. Many fields such as CCW Address, Key, Sub-channel and Device Status and Count are obvious.

The iORB and the iIRB are almost exact copies of the architected versions. The only difference is that some of the architected fields are not applicable to the iIO Facility. The iSCHIB is larger than the architected version to give the iIOF applications greater control over the subchannels.

The following definitions refer to the iSCHIBf in FIG. 8.

WORD 10

BIT 00–07 LINK ADDRESS-0. If not '00'x or 'FF'x, this field contains the link address assigned to the control unit attached to path 0. The link address is valid for all channel types, but has no meaning for parallel channels. For ESCON Converter channels, the link address has meaning only when the channel is attached to a switch. If the Link Address field is zero, a link address has not been assigned to the control unit.

BIT 08–15 CONTROL UNIT ADDRESS-0. Bits 04–07 of this field contains the 4-bit logical address for the control unit image attached to path 0. This field is used only for ESCON channels. Bits 00–03 of this field are reserved.

BIT 16–23 LINK ADDRESS-1. Link Address for path 1.
BIT 24–31 CONTROL UNIT ADDRESS-1. Control Unit Address for path 1.

WORD 11

Link Addresses and Control Unit Addresses for paths 2 and 3.

WORD 12

Link Addresses and Control Unit Addresses for paths 4 and 5.

WORD 13

Link Addresses and Control Unit Addresses for paths 6 and 7.

WORD 14

BIT 00–07 DEVICE ADDRESS. The identity of the device on the channel path.

BIT 08 ESCON (S). When one, this bit indicates that the device represented by this sub-channel is attached to an ESCON channel path or paths. When zero, this bit indicates that the device is attached to a parallel channel path or paths.

BIT 09 RESERVED.

BIT 10 FRONT-END INTERCEPTION. When one, this bit indicates that function-pending subchannels are to be intercepted for the iIO Facility. The interception occurs after the subchannel is dequeued from the work queue, but prior to executing the function.

BIT 11 BACK-END INTERCEPTION. When one, this bit indicates that status-pending subchannels are to be intercepted for the iIO Facility. The interception occurs after the subchannel is made status pending, but prior to making it interruption pending.

BIT 12–15 IIOF APPLICATION ID (IAI). When this field is not zero, it identifies the iIOF application currently assigned to this subchannel. When an intercept occurs, this ID determines which iIOF is called by the iIO Application Manager. When this field is zero, it indicates that the subchannel is available for new iIOF applications. A subchannel may be modified only when the IAI field in the iSCHIB is equal to the IAI field in the subchannel or when the IAI field in the subchannel is zero.

BIT 16–23 RESERVED.

BIT 24 ENABLE STATUS VERIFICATION (V). When on, the Status Verification Facility is enabled for this subchannel and status combinations presented by the device are checked for validity. If the status is not valid, an IFCC is generated.

BIT 25 INTERFACE TIMEOUT (T). When off, all I/O sequences other than data transfer sequences are timed out in 7.5 to 8 seconds. Data transfer sequences are not timed out. When on, data transfer sequences are also timed out in 30 seconds. This bit is only used for the parallel channel.

BIT 26 ENABLED FOR STATUS (E). When on, this bit indicates that the subchannel is enabled for the presentation of status. When zero, status is stacked. NOTE: This bit is normally equal to the architected enable bit that controls the enablement of both I/O functions and status. A separate control is provided for iIOF.

BIT 27 RESERVED.

BIT 28 PREFERRED PATH VALID (P). When on, this bit indicates that the Preferred Path value in the sub-channel is valid and that the path selection rotation for a new start function should always start with the preferred path. If this bit is off then a preferred path has not been specified and the path selection rotation starts with the next path.

BIT 29–31 PREFERRED PATH (PREFP). When the Preferred Path Valid (P) bit is set to one, this field specifies the path to be attempted first in the path selection rotation for a new start function.

WORD 15 LOGICAL CONTROL UNIT ADDRESS. The absolute address of the control block representing the logical control unit associated with this subchannel. This field is required for setting up shadow subchannels.

SETUP—A setup procedure must be performed for all iIOF applications. Independent of the iIO Facility, each application must receive control in order to allocate work areas and reserve subchannels. A work area and subchannels are reserved by executing iIOF functions. Each application is assigned a unique 4-bit ID that is used to reserve iIOF subchannels.

A typical scenario is described in the following steps:
1. Execute the Reserve-Work-Area Function CALL to get a work area assigned to the application.
2. Execute the Read iIOF Info function CALL to obtain information about the facility.
3. If the application requires shadow subchannels, execute successive Store-Function CALLs until a iSCHIB is stored that has the iIOF Application ID equal to zero. The Store-Function CALLs specify subchannel numbers provided by the Read iIOF Info function.

4. In the iSCHIB, change the iIOF Application ID field to the application's own ID.

5. Reserve the shadow subchannel by executing the Modify-Function CALL. The subchannel now contains the applications ID.

6. If required, a similar procedure is used to reserve diagnostic subchannels.

When an application Is shut down it should release all subchannels previously reserved by using the Modify-Function CALL and release the assigned work area by executing the Release-Work-Area function CALL.

The next detailed embodiment described herein is shown in FIGS. 14 through 39.

FIG. 14 shows a Mainframe with its Support Processor (SP) at 1401, an OSA Card at 1402 and a Serial Channel at 1403. The OSA Card is essentially an integrated Serial Channel at 1412 connected to a Communication Controller at 1410 over an internal electronic serial link at 1413. Attached to the Serial Channel over a Fiber Cable at 1404 is a Communication Controller at 1405. This prior art Communication Controller has a Keyboard, Display, Hard Drive and Floppy Disk attached as shown in at 1408. These peripherals are used in the initialization of the communication controller, performing updates to the internal microcode that runs the controller as well as for storing error data for the purpose of debugging controller problems. In addition, these peripherals can be used to view various statistics with regards to the attached LAN at 1406. In short, these peripherals are there to provide serviceability of the controller.

Also in FIG. 14 is the OSA Card at 1402 attached to a LAN at 1407. The OSA Card is an integrated Serial Channel and Communications Controller as shown in FIG. 15 attached directly to the Mainframe. However, the noticeable difference is the lack of a keyboard, display, hard drive and floppy. Thus, the question that comes to mind is how do you provide serviceability to the OSA without the Keyboard, Hard Drive, Display and Floppy?

FIG. 15 shows the functional elements and structure of OSA Card. Shown at 1501 is a Serial Channel connected across a Serial Electronic Link at 1502 to a Serial Control Unit at 1503. Note that the Serial link shown at 1502 is not a glass fiber, but rather electronic glue logic that emulates the Serial Link in electronics. This link is the only way the Mainframe can communicate with the Communication Controller portion of the card. Thus, if one were to attempt to provide serviceability to the OSA Communication Controller at 1504 through the mainframe connection shown at 1505, the only way to do so without making significant hardware changes to the OSA card is through the Serial Channel shown at 1501 and through the Serial Electronic Link shown at 1502. However, in order to do so, that same Serial Electronic Link at 1502 that is used for transferring data must also be shared with transferring the kinds of serviceability requests that are described above for the Communication Controller at 1405. This invention describes a method and system for achieving the goal of being able to provide serviceability to controllers, control units or other adapters from a mainframe through the standard channel I/O interface. This idea of providing serviceability over the Serial Link is extendable to be used with other adaptors connected to hosts that are typically attached over some medium such as an Serial fiber link.

The Support Processor keyboard, hard drive, display and floppy shown at 1409 will now be able to be used to support the OSA communication controller shown at 1410 to perform an equivalent role that the keyboard, display, hard drive and floppy shown at 1408 has for Communication Controller shown at 1405. However, the mainframe attached support devices at 1409 have the advantage in that only 1 set of support devices is needed to provide support for a multitude of OSA Cards attached to the I/O Sub System (IOSS) shown at 1411. (Only one OSA Card is shown in the FIG. 14.) The mechanism and system for accomplishing the goal of providing serviceability over a standard I/O interface is described in the subsequent paragraphs.

In order for serviceability requests to be transmitted by the standard protocols for communicating over a Channel, Electronic Link and Control Unit as described in the "ESA/390 Priciples of Operation", "ESA/390 Common I/O Device Commands", and "ESA/390 ESCON I/O Interface", an emulated device shown at 1506 called the OSA Service Device was created. In this embodiment, the OSA Service Device is assigned with Device Address of 'FF'X and is an area in the RAM on the OSA card. To the Serial Channel shown at 1501 and to the Serial Control Unit shown at 1503, the OSA Service Device is a device that is the same as any other device shown at 1507 in terms of the protocols that must be observed when communicating across the Serial link.

The basic difference between the OSA Service Device shown at 1506 and the devices shown at 1507 is the OSA Service Device is a command and control emulated device in RAM whereas the devices shown at 1507 represent real devices on a Local Area Network (LAN). For both the LAN devices and the OSA Service Device, Channel Command Words (CCW) in Channel Programs executing in the mainframe are used to be able to communicate with these devices. Channel Programs and CCWs are described in ESA/390 Priciples of Operation and ESA/390 Common I/O Device Commands. However, the OSA Service Device has additional Channel Command Words (CCW) and Subcommands that are interpreted by the Control Processor shown at 1508. These special CCWs and Subcommands have been added to the existing set described in ESA/390 Priciples of Operation and ESA/390 Common I/O Device Commands and they do not affect the Serial Channel and Serial Control Unit protocols. The OSA Service Device is under control of microcode running in the Control Processor shown at 1508. When Read or Write CCWs are executed on the OSA Service Device, transfer of data occurs either from RAM or FLASH rather from a device on the LAN. For example, the "Alter OSA Storage" Subcommand and its associated CCWs causes data to be transferred from mainframe storage, through the mainframe connection at 1505, through the Serial channel, over the Serial Link, through the Serial control unit into RAM or FLASH at 1509 or 1510.

To use this OSA Service Device to communicate serviceability requests to and from the OSA Card in FIG. 16 at 1601 without having host programs running in the CPU shown at 1602 having access to OSA Service Devices, an iIOF application called the OSA internal Application (OSA/IA) shown at 1603 was developed to have exclusive use of the OSA Service Devices. The OSA/IA uses Diagnostic Subchannels as previously described as the means to communicate with the OSA Service Devices. One Diagnostic Subchannel is assigned to each OSA Channel.

One per OSA Channel is needed because if multiple OSA cards are plugged into the IOSS at 1604, the OSA/IA must be able to keep track of service requests from each of the OSA channels in a concurrent manner.

In this embodiment, a Device Address (or unit Address, as it is referred to in the ESA/390 IOCP Users Guide) of "FF"X is used for the OSA Service Subchannel. Diagnostic Subchannels will be assigned as OSA Service Subchannels which are hidden from Software running on the host because the device valid bit is set-off in the diagnostic subchannels. To ensure exclusive use of OSA Service Devices for the OSA/IA and not allow Software running on the host the capability of accessing the OSA Service Devices, a new requirement is placed on the IOCP program or equivalent to not allow the user to specify a device on OSA channels with a Device Address equal to "FF"X.

FIG. 38 and FIG. 39 show how the OSA Service Subchannels are initialized at system initialization time using iIOF Function calls. In FIG. 38, a Diagnostic Subchannel used as an OSA Service Subchannel is assigned to each OSA Card. This is the basis for providing serviceability to different OSA Cards concurrently. At 3902, each Diagnostic Subchannel that is used for the OSA/IA will have the B bit=1 to cause the iIOF to intercept it on the Back End and the IAI set to Application 1. The F bit will be set to 0 since Front End interception is not needed for this application. When Diagnostic Subchannels are stored at 3901, the Modify-Function microcode will enable a System Storage Area (SSA) Authority control in the internal SSA subchannel that will allow Channel Programs to be executed from SSA for the OSA Service Subchannel. This is important because the iIOF work areas in FIG. 17 at 1704 which are in the SSA will be used to build channel programs. FIG. 16 at 1605 shows the additional data path for CCW execution and data transfer that is obtained by enabling the SSA authority mechanism. When the SSA Authority control is disabled for the subchannel, CCW processing can only occur from Main Storage at 1608 for I/O Subchannels as shown for the Serial Channel at 1607 as well as for the I/O Subchannels for the OSA Serial Channel at 1609.

In addition, the iIOF Work Areas (IIWA) at 1701 and IOSS-SP Communication Area (ISCA) at 1702 are also set up. Note that SPE 1610 in FIG. 16 has access to system storage 1606. FIG. 17 shows the layout of some areas located in the SSA at 1606 necessary for OSA/IA processing. The IIWA (iIOF Work Area) is set up to handle OSA Service Subchannel activity for multiple OSA Service Subchannels. In addition, multiple OSA Function Parameter Areas (OFPA) at 1703, one for each Channel Path (or CHPID) that requires a Diagnostic Subchannel, are setup so the Support Processor at 1610 can initiate Service Requests to multiple channels without waiting for each Service Request to complete. Note that the OFPA at 1703, the Work Area at 1704 and the CHPID-Subchannel Table at 1705 are indexed by OFPA # thereby linking them to each other. At 3903, the CHPID-Subchannel table is built to provide a fast way to associate CHPID to OSA Service Subchannel. (the SP will use the CHPID number, not the Subchannel number in the OFPA when initiating service requests to the OSA/IA.) The ISCA@ is passed to the setup code in FIG. 38 and FIG. 39 at initialization time and saved at 1706 because it is needed by OSA/IA to find where the OFPA is located. Also in the OFPA are OSA Logging areas at 1707 which will be used as a holding area to dump error logs from the card to SP DASD (or hard drive) for analysis. At 1708 is a data drop off area which is used for the Alter and Display OSA Memory Service Functions, for example.

FIG. 18 shows the format of each OSA Function Parameter Area (OFPA). The SP should set up the Function ID at 1801, Status at 1802 and Additional Parameters at 1803 depending on the Function ID as indicated in FIG. 18. The Additional Parameters for the various functions are described in FIG. 19 thru FIG. 21. Note that other embodiments could have a larger suite of Function IDs and Additional Parameters. The suite of Function IDs and Additional Parameters shown in this embodiment, are minimally required to load new microcode on to the adapter and get the card operational.

Each non-zero Function ID listed in FIG. 18, except for the "Reset OSA" function at 1804, will cause the OSA/IA to build and initiate Channel Programs to perform the function. The Reset OSA function works a little differently. The Reset OSA function will cause OSA/IA to signal the Channel identified by the CHPID in the OFPA at 1805 to drop outbound "electronic" light on the Serial Link. A small hardware change in the "electronic link" or glue logic in FIG. 15 at 1502 was made to signal the components in the OSA communication controller at 1504 to reset when light is dropped. The OSA card will reset when the Channel at 1501 turns off outbound light to the Control Unit at 1503 on the electronic link at 1502. This mechanism was needed because should the Control Unit at 1503 or the Control Processor at 1504 hang, for example, the drop light reset would be as effective as pushing a reset button. In System/390 processors, the dropping of light on a Serial Link is the prior art practice in normal system operations such as when a channel is physically deconfigured as shown in FIG. 30 and will be discussed later.

FIG. 22 shows the transfer of control among the system elements to handle Support Processor initiated OSA Service Function requests. At 2201, the SP must first set up the OFPA and if need be, the OCDA in FIG. 17 for the channel path or paths with the Function(s) needing to be performed. With the basic functions described in FIG. 18 thru FIG. 21, most tasks can be accomplished. If the SP wanted to perform an update to the microcode in the flash area in FIG. 15 at 1511, the SP in FIG. 14 at 1401 would load the OCDA at 1708 with microcode stored on SP Hard Disk or DASD at 1414. Then the SP could set up one or more OFPAs with the "Alter OSA Memory" Function and Additional Parameters shown in FIG. 18 and FIG. 19. The SP would then signal the IOSS by writing the Q-Bus register at 2202. The description follows.

At 2203, control now passes to the IOSS and Q-bus intercept processing begins in FIG. 23. At 2301 is a description of the Q-bus fields. The Q-bus is a prior art signalling mechanism between the Service Processor and the IOSS and is a 2 byte register containing a Command (First Byte) and Qualifiers (Second Byte). What is new is the "1B"X Q-Bus iIOF intercept value that would cause the test at 2302 to take the YES leg and invoke the Support Manager at 2303. Non-Q-Bus iIOF Commands would take the NO leg at 2304 to continue normal Q-Bus command processing. The Q-bus iIOF Application ID is passed at 2301 as well as an iIOF Sub-Function value that can further granularize the type of request. Since the Diagnostic Subchannels were set up with IAI=1 at 3902, the Q-bus iIOF Application ID should be set to 1 by the SP to cause the OSA/IA to be called. The Q-bus Sub-Function at 2301 of "4"X indicates an SP initiated function requiring a Start-Function to be issued by the OSA/IA. These constructs in FIG. 23 were added to the iIOF in FIG. 16 at 1611 and 1612 because in this embodiment, the Service Processor microcode runs in its own processor, but it has access to the Q-bus at 1612 and SSA at 1606.

At 2305, a test is made to determine if the return code from the Support Manager should be passed back to the SP at 2306. The Q-bus is a bidirectional bus which can also be used by the IOSS to signal the SP about he completion status of the operation. When the Q-bus is written at 2306, the SP will be freed up from the Synchronous portion of the Service Function. The SP can then go off and perform other processing. A Q-bus return code value at 2305 other than zero will indicate to the SP that the OSA/IA did not successfully initiate the Requested Service Function and the SP can take recovery actions if needed. A zero Q-bus return code at 2306 will indicate to the SP that the Requested Service Function has been initiated and the SP will later be signalled when the Asynchronous completion of the Service Request has been performed. The SP will be signalled when the Asynchronous portion of the Service Function is completed when the OFPA Status in FIG. 18 is updated to a value greater than or equal to 02 as indicated at 1806. If the YES leg is taken at 2307, the SP will continue to wait for completion of the Synchronous portion of the command and is used mainly for other IOSS Q-bus commands.

At 2303, the Support Manager will be called. In FIG. 24, the Support Manager, like the iIOF Application Manager, will call the application based on IAI as shown at 2401. When the Application is called with an IAI=1, the OSA Support Function Process (OSA/SFP) at 2501 in FIG. 25 will get control based on the sub-function=4. The additional Sub-Function values of 5 and 6 are supported at 2502 and 2503 to give the Service Processor additional capability.

The OSA Generic Function Process (OSA/GFP) at 2502 is used when a user wants to enter in a channel program as a handloop for test and debug purposes. The OSA/GFP will set the iORB to point to CCWs that have been entered into the SSA by the SP. Then the OSA/GFP will initiate a Start-Function. The SP console is used to enter the CCWs into SSA and invoke the OSA/GFP. OSA/GFP will get control when a Sub-Function of 5 is passed in the Q-bus at 2502.

The OSA/Cancel Function Process (OSA/CFP) at 2502 provides the SP with a means to issue a Clear-Function to terminate an in-progress channel program should the SP timeout on a previously initiated function using the OSA/SFP or OSA/GFP. The OSA/Cancel Function Processor is invoked in similar way as the OSA/SFP. When the OSA/CFP is signaled by the SP, it will issue a Clear-Function on the Diagnostic subchannel for the selected Channel Path. The OSA/CFP will report the results in a manor similar to the OSA/SFP. OSA/CFP will get control when a Sub-Function of 6 is passed in the Q-bus at 2503.

FIG. 26 shows the processing steps that the OSA/SFP will perform. OSA/SFP must first determine which OFPA in FIG. 17 has a function pending in it. At 2601, the first OFPA with a non-zero Function ID and a zero Status byte as shown in FIG. 18 will be selected. At 2602, it is determined if a Reset OSA Function is requested. If so, the OSA Channel (or CHPID) is signalled to drop light at 2603. When the Channel is successfully signalled, the OFPA Status is updated to say the "Function Completed" (02) at 2604 as described in FIG. 18 at 1806. This status is set because the OSA Reset Function has no Channel Program to run and the completion of the reset is handled by the IOSS MAIN as will be seen in later drawings. A return code of 0 will be passed back to the SP at 2605 to free the SP from the Synchronous portion of the command as well.

Once the SP has been given a response to the Synchronous portion of the Service Function when the IOSS writes the Q-Bus Response in FIG. 23 at 2306, the SP can initiate another Service Function for a different OSA card. It can do this by setting up the OFPA, if it hadn't already done so, for the CHPID that the SP wants the new Service Function to be performed on, then invoke the Q-Bus as described above. Since the OFPA of the already started Service Function has been updated as described above, the FIG. 26 processing will cause the OFPA of the already initiated Service Function not to be selected and OFPA of an uninitiated Service Request to be selected.

If the function is other than an OSA Reset, processing will proceed at 2606. The Chpid-Subchannel Lookup Table in FIG. 17 will be used to determine which OSA Service Subchannel for the particular Chpid will be used to perform the Service Function. At 2607, an attempt will be made to initiate the service function. If initiation was successful, the OFPA Status will be updated as "Function Initiated (01)" at 2608. The SP will then be signalled later on when the Asynchonous portion of the Service Function has completed. Otherwise, the NO leg at 2609, will end up passing back a Non-Zero return code resulting in the SP detecting the operation wasn't initiated.

FIG. 27 shows the processing to be done to initiate the Start-Function for the requested Service Function. At 2701, the appropriate CCWs needed to perform the Service Function are built in the work area for the particular OFPA shown in FIG. 17 at 1704. At 2702, the iORB is set up in the work area at 1704 with the Interruption Parameter used as a footprint for tracking the progress of the Service Request. Some Service Functions, such a Write Load Module, using Alter OSA Memory, may require that the OSA/IA initiate and handle the results from more than one channel program on the same OSA channel to accomplish the task of moving data from SSA to the OSA card flash before notifying the SP that the operation is completed. The Start-Function is initiated at 2703.

Upon successfully starting the Channel Program with a zero return code passed back at 2704, the iIOF processing of the Start-Function of the Diagnostic Subchannel that was dequeued from the Work Queue in FIG. 16 at 1613 will result in the selected OSA channel being signaled to initiate the Channel Program as shown in FIG. 22 at 2204. At 2205, the channel will signal the Communication Controller to initiate the CCWs (I/O Sequences). At 2206, the OSA Service Device will be started and the Communication Controller will process the I/O Sequences. The Channel at 2209 will perform the data transfers that are required into or from the SSA (and not the Main Storage Area in FIG. 16). In the mean time, the IOSS will send back an ACK to the SP at 2207 in the form of a write Q-Bus return code at previously described in FIG. 23 at 2306. The SP is done with the Synchronous Portion at 2208 and can go off and do other processing until it is signalled or polls the OFPA Status byte for a change in the OFPA status byte in FIG. 18 at 1802.

When the I/O Sequences have completed, the Communication Controller will transmit combined or split "Channel End/Device End" status at 2210. These status settings are described in the "ESA/390 Priciples of Operation". The channel will update the internal SSA subchannel with the status at 2211 and signal the IOSS. IOSS will get control and determine that the status requires that the subchannel be placed on the Interrupt Queue. At 2212, the Back End Intercept will occur in FIG. 4 at 41, the Application Manager will be called at 42, then the OSA/IA will be called by the Application Manager in FIG. 5 at 51 because the IAI will be set to 1 in the subchannel.

OSA/IA in FIG. 25 will get control again and determine from the Function Code at 2504 that status needs to be handled. The OSA Back End Intercept Process (OSA/INT) will be called at 2505, and will get control in FIG. 28. At 2801 a Test-Function will be done to determine the status. Then at 2802, the CHPID associated with the Subchannel can be determined using the "Chpid-Subchannel" Table shown in FIG. 17 at 1705. This method is used because the OFPA # must be obtained so the correct OFPA at 1703 can be updated with status if the OSA Service Device presented final status to the channel program. If the status is only channel end as tested at 2803, the OFPA Status cannot be updated until device end status comes in which signifies completion of the usage of the OSA Service Device for that channel program. The-status should not be an Asynchronous/Attention Unit Check in this case as tested for at 2804, because the status is the result of the SP initiating a Service Function. Thus the no leg at 2805 should be taken in this case. If the final status is OK (Channel End/Device End or Device End in split status case), a check is made at 2806 to determine if additional channel programs need to be initiated to complete the processing of the Service Function. (This is also shown in FIG. 22 at 2213.) It may be desirable to break up the Service Function into multiple Channel Programs. This is sometimes needed if the results in terms of data obtained from one channel program dictate the execution of the next channel program. The Interruption Parameter can be used to track which channel program is running for the particular Service Function. If no additional programs need to be run, OSA/INT updates the OFPA Status to "Function Complete" at 2807. (This is also shown in FIG. 22 at 2214.) Depending on the implementation, this update alone may be enough to signal the SP that the processing is completed if the SP is periodically polling the Status field in the OFPA. Otherwise, the SP could be interrupted using the Q-bus or equivalent. In either case, an RC=0 is passed back so that when control is finally passed back to IOSS, from FIG. 28 to FIG. 25 to FIG. 5 to FIG. 4, the IOSS won't take any additional action with this OSA Service Subchannel. In cases where the OFPA Status is set to "Function Failed" at 2808 and 2809, the operation is considered terminated and the SP will be signalled as is the case for "Function Complete" status. It is then up to the SP to retry the Service Function. At 2810, the Interrupt Parameter will need to be reset because the Service Function at this point is considered done (successful or failed). The resetting of the Interrupt Parameter can be done by first doing a Store-Function, then resetting the field, then a Modify-Function for the Diagnostic Subchannel being worked on. At this point, in the Support Processor Initiated Function Request in FIG. 22, the process is done at 2215.

FIG. 30 shows the System/390 Channel Path Deconfigure Offline process. This process is shown to point out the effect of turning off light to the OSA Communication Controller. When the Channel drops outbound light to the Communication Controller at 3004, the Communication Controller will drop inbound light to the Channel at 3005 and begin its reset process. (Steps 3001 thru 3004 and 3006 thru 3007 are prior art.) The Reset process caused by the dropping of light to the OSA Communication Controller causes all the hardware (see FIG. 15) in the Communication Controller portion of the OSA card to be reset. Diagnostics that are stored in Flash at 1513 are run. If an error occurs with the diags, an Error Log will be stored in Flash at 1514 to be logged out by a process that will be described later in this disclosure. After the diags are run, the Operational Microcode will be booted from Flash at 1511 into RAM at 1515.

FIG. 31 shows the System/390 prior art Configure Channel Path Online for the purpose of showing how the OSA card is driven through its initialization sequence when outbound light is turned on by the Channel at 3103. At 3104, the OSA Communication Controller will remain in the reset state until two conditions are met. First, an ample amount of time has elapsed to complete its reset process, and second, the Channel has turned on outbound light to the Communication Controller. Once the Reset is complete, the Communication Controller will raise inbound light to the channel at 3108 and Serial Link Initialization will proceed as it does in the prior art. Once link initialization is complete and the channel is operational at 3113, the OSA/IA will get involved in the initialization process as it continues in FIG. 32.

FIG. 32 is a continuation of the OSA reset sequence showing how the OSA/IA becomes involved. At 3201, the OSA Service Device will generate an Attention/Unit Check which causes a Back End Intercept to occur on the OSA Service Subchannel for that OSA channel at 3202 in much the same way as the processing occurred in FIG. 22 at 2212.

The Backend processing will proceed through the IOSS in FIG. 4, then to the Application Manager in FIG. 5, then to OSA/IA in FIG. 25, then to OSA/INT in FIG. 28. However, in FIG. 28 at 2804, processing will proceed to the OSA/UCP (Unit Check Processor) at 2811 because the I/O Status is an Attention/Unit Check. This is a way that the OSA Communications Controller can place a Service Request to the Host.

In FIG. 29 at 2901, the test for Attention/Unit Check will proceed down the YES path. At 2902, a test is made to check if Attention/Unit Check processing is already going on for this OSA channel. If YES, this is treated as an error because one Attention/Unit Check process (Sense/Read Log and Clear Log) can be maintained for a specific OSA channel at a time. However, Attention/Unit Check processing is allowed to overlap for different OSA channels at the same time. If the NO branch is taken, a Sense Channel Program will be set up at 2903 to cause the Sense Data to be stored in the Work Area in FIG. 17 at 1704. The OFPA # will be used to determine the address of the area to use. In addition, the Interruption Parameter is set to "Asynchronous Sense In Progress" as a means to footprint this unit check process. Footprinting is needed because 2 additional channel programs may have to be set up and initiated depending on the contents of the Sense Data. The process at 2903 to initiate the Start-Function is the same as the one used in FIG. 27. Once the Sense is initiated, control is passed back to FIG. 28, then to FIG. 25, then to the Application Manager in FIG. 5, then to the IOSS in FIG. 4 with RC=0. The issuing of the Sense Channel program is also indicated in FIG. 32 at 3203. The Communication Controller will send back the Sense Data and give ending status at 3204. At 3205, control will eventually get back to FIG. 29 as it did for the Attention/Unit check status. However, the check at 2901 will take the NO leg and the test for Normal Ending Status will be made at 2904. Then the Interrupt Parameter will be used to determine what Channel program Just completed at 2905. In this case, the "Asyn Sense in Progress" indicates the Sense channel program was in progress. At 2906, the Sense Data will be analyzed. If the Sense Data indicates that a Log is present, a new channel program and iORB with the interrupt parameter equal to "Read Error Log in Progress" will be set up at 2907 to read the Error Log from Flash located in FIG. 15 at 1514 into one of the OSA Log Areas in FIG. 17 at 1707.

A Log in Flash may have been created due to a Diagnostic Failure, for example. Then, at 3206 and 3207, the data transfer of the Log into System Storage will occur. When the data transfer is complete, ending status sent at 3206 on the OSA Service Subchannel, it will be intercepted in the back end and control will be passed along to the OSA/UCP in FIG. 29 like the ending status for the Sense command was processed. Then at 2908, the YES leg will be taken and a Clear Error Log Channel program and iORB will be setup at 2909 (also shown at 3208). A Clear Error Log channel program is required to reset the error log space in flash at 1514 so the space can be used if a new log needs to be processed. When the Clear Error Log completes, ending status at 3209 on the OSA Service Subchannel will be intercepted in the back end and control will be passed along to OSA/UCP in FIG. 29.

At 2910, the YES leg will be taken and the Interrupt Parameter will be reset at 2911 as was done in FIG. 28 at 2810. In order for the SP to find out about the Log, the OSA/UCP at 2912 will signal the SP that a Log is present in System Storage in FIG. 17 at 1707. When the SP is signalled as also shown in FIG. 32 at 3210, the SP at 3211 will dump the Log from SSA in FIG. 17 at 1707, onto SP DASD or Hard Disk in FIG. 14 at 1414. This log can now be obtained remotely as do the other logs dumped to the Support Processor DASD. A big improvement from having to dump a control unit log to floppy and mail it to development. If there was no log to dump from the OSA card as determined in FIG. 29 at 2906, the Interrupt Parameter will be reset at 2913. At both 2912 and 2914, a determination will be made to see if the Sense Data indicates that the OSA card went through a reset to determine if the SP should be signalled that the card was reset.

In FIG. 32 at 3212, if it was determined from the sense data that the card was reset, the reset sequence will now enter the Post Reset Initialization (PRI) phase in FIG. 33. At 3301, the SP will set up the OFPA in FIG. 17 for the OSA channel that had been reset and then do a "Display OSA Memory". The Additional Parameters for the Display Memory in FIG. 20 would contain the predetermined Flash address of the Master File in FIG. 15 at 1512. The Master File contains the version and levels of each of the microcode modules in the flash area at 1511 and their locations. The SP will then proceed to invoke the same process at 3301 to process a Support Processor initiated Service Function as shown in detail already for FIG. 22. At 3302, once the Master File is read, the SP will compare the levels of code in the Master File at 1512 read from the OSA card against the levels within the Master File it has stored on DASD in FIG. 14 at 1414. At 3303, if there is a mismatch, the SP will load the appropriate microcode into OCSA at 1708. At 3304, the SP will invoke "Alter OSA Memory" Service Functions to store the updated microcode from the OCDA to Flash on the Card. After the microcode has been updated in flash, the SP at 3305 will write the updated Master File to the card. This will ensure that the card is not being continually updated every PRI sequence. If the OSA microcode got updated, then an OSA Reset will be needed to make the new code in Flash the operational code as indicated at 3306. However, once the Reset command is issued, the SP should abort from the PRI sequence because the OSA Communications Controller will appear as Not-Operational throughout the OSA Reset sequence and the reset will bring the card back to its initial state. If the card doesn't have to be reset, the PRI sequence will continue at 3307 where the Set Port Enable Function is issued by the SP for each port on the OSA card.

At 3308, the SP will issue the Enable I/O Service Function. What this function does is it causes the non-OSA Service Devices that have been defined to be in the configuration of the OSA card to go from being in a non-operational state to an operational state. The default state of the non-OSA Service Devices after a card reset is to be in a non-operational state. The OSA Service Device will be left in the operational state after link initialization has completed in FIG. 31 at 3113 so the Attention/Unit Check processing could occur in FIG. 32 and the OSA Service Subchannel could be used in the PRI sequence in FIG. 33. The purpose of having the host accessible devices to be in the non-operational state during the PRI sequence is to prevent the host OS from initiating I/O sequences when the card could potentially be going through various updates during the PRI that could affect the outcome of the operations on these host accessible devices. Thus, the Enable I/O CCW is interpreted by the OSA card to put devices in the operational state. When the Enable I/O completes, the OSA/IA will signal the Host OS with an I/O Accessibility report to assist the OS to determine if it should retry I/O operations on the OSA channel should the host have encountered non-operational conditions on the devices. At 3309, the PRI ends when Enable I/O completes.

In the event that the OSA control unit detects a failure that requires the OSA control unit to be logged and recovered, FIG. 34 shows the recovery process on an OSA detected error. At 3401, the OSA Card detects a hardware error. In FIG. 37 at 3701, the Communication Controller will signal the Serial Channel that a failure has occurred by dropping inbound light to the channel. At 3702, the Controller will begin logging critical error data to nonvolatile flash memory in FIG. 15 at 1514. This step assumes that the error logging capability of the control unit is still operational. At 3703, the Serial Channel notifies the upstream IOSS that this loss of inbound light has occurred. This will cause logical paths to be removed and outstanding I/O operations on that channel to be terminated with the proper status. (This is already being done when a loss of signal condition is detected on any Serial channel). At 3705, the Channel will give the Controller some time to log, then at 3706, the channel will drop, then raise outbound light to the OSA Controller. This will cause the OSA Controller to go through a complete reset at 3707. At 3708, upon successful completion of the logging and reset, the OSA controller will turn on inbound light to the OSA channel. At 3709, when the serial channel sees inbound light, it will signal the upstream IOSS that the link is operational. If inbound light is not seen by the channel within a preset time period, it will take additional recovery actions and the remaining steps in this process will be skipped. (In this embodiment, the channel will request to be made "permanent, initialized" if light is not seen within a few minutes from the time it saw light drop.) At 3710, when the upstream IOSS sees this link operational signal, it will initiate link initialization to reestablish a logical path between the channel and controller. This step is already implemented in the IOSS. At 3713, once a logical path is established, the IOSS marks the path as operational and the processing continues in FIG. 32.

FIG. 35 shows the process by which an OSA Log can be forced as requested by the Support Processor. At 3501, the Support Processor will signal the IOSS that an OSA Controller log is requested when a user requests a log via a user interface provided by the Support Processor. At 3502, the IOSS gets the request and it initiates a recovery and force log process. This process will invoke existing channel recovery processes shown at 3503, 3504 and 3505 to clean up existing I/O activity on the channel. At 3506, the Serial Channel is signaled by the upstream IOSS to send a special Serial sequence out on the link to the OSA controller at 3507. The sequence '04'x was chosen. At 3508, upon receipt of this special sequence, the OSA controller will continue the process in FIG. 37. At 3509 the IOSS lets the SP know that the force log was initiated so the SP can alert the user at 3510 that the logging is in progress.

FIG. 36 show a process by which an iIOF application such as the OSA/IA can force an OSA Controller log and put the OSA through recovery. At 3601, OSA/IA detects an error that requires an OSA controller to be logged and recovered.

At 3602, the IOSS gets the request from the OSA/IA and it initiates a recovery and force log process. This process will invoke existing channel recovery processes shown at 3603, 3604 and 3605 to clean up existing I/O activity on the channel. At 3606, the Serial Channel is signaled by the upstream IOSS to send a special Serial sequence out on the link to the OSA controller at 3607. The sequence '04'x was chosen. At 3608, upon receipt of this special sequence, the OSA controller will continue the process in FIG. 37.

In conclusion, the method and system for controlling the serviceability of adaptors connected by an I/O channel interface provides for a means to automatically update non-volatile microcode storage and make the updated code active over a standard I/O interface from a remote location as demonstrated. The adaptor need only be Deconfigured, then Configured back on line to cause a reset thereby giving it initiative to go through the PRI sequence. In addition, an automatic logging and recovery mechanism is provided whereby logs stored in the Communications Controller could be obtained over a standard I/O interface. Recovery and Logging actions can be initiated by the adaptor, the iIOF application or by the Support Processor, either manually or automatically. Service Requests on different Cards could be initiated concurrently due to the assignment of one subchannel per adaptor thereby providing a time savings in the above processes.

It should be understood that the embodiments described herein have been provided by way of example and not by way of limitation. In light of the foregoing description, many modifications and variations exist which do not depart from the scope and spirit of the invention as defined by the appended claims.

Having thus described our invention, what we claim as new and desire to secure by Letters Patent is:

1. A method of remotely providing service control functions for any number of I/O adapters to be serviced by remote service hardware (SPE), I/O adapters connected by one or more I/O channels to an I/O subsystem (IOSS) of a computer system, wherein the method eliminates a need for additional service hardware for supporting the adapters by enabling service control functions for any I/O adapter to be controlled by the remote service hardware, the method comprising the steps of:

structuring for an internal I/O facility (iIOF) of an IOSS at least one microcoded service support SS subchannel control block (SS subchannel) of the IOSS for each I/O adapter, each I/O subchannel containing at least one interception control field (B) for controlling initiation of execution of a microcoded iIOF application (IA) in response to an associated interrupt signal provided by an associated I/O adapter, and at least one application entry pointer field (IAI) for identifying and locating an execution entry point in a microcoded iIOF application, and setting field B to an active state for diverting I/O adapter operations using the SS subchannel, sensing the active state of field B by an IOSS process when an I/O adapter interrupt signal is provided for status information to cause the SS subchannel to be taken for processing by the IOSS, locating a microcoded iIOF application (IA) process of the iIOF at the execution entry point addressed by an address derived from the IAI field, and starting execution of the IA at the execution entry point to execute a control operation that transfers control signals from the IOSS to the SPE to communicate status information of the I/O adapter by generating and storing status information from an SS subchannel based on an SS condition resulting from an SPE command or an I/O adapter operation.

2. A method of remotely providing service control functions for any number of I/O adapters by remote service hardware as defined in claim 1, the method comprising the further step of:

providing at least one other subchannel for each I/O adapter, each other subchannel containing B and IAI fields operating independently of the B and IAI fields in the SS subchannel for the same I/O adapter, and operating the other subchannel independently of the SS subchannel for the same I/O adapter except for SS operations being sent to the SPE under control of the SS subchannel.

3. A method of remotely providing service control functions for any number of I/O adapters by the same remote service hardware as defined in claim 2, the method further comprising the steps of:

transferring data between the IOSS and the I/O adapters in response to execution of programs for the other subchannels, and transferring the data for the other subchannel between the IOSS and the CPU while the SS subchannel remains ready to communicate service data between the SPE also in response to operation by the same I/O adapter.

4. A method of remotely providing service control functions for any number of I/O adapters by a single remote service hardware (SPE) as defined in claim 2, the method further comprising the steps of:

sending by the SPE an SS command over a high priority bus to the iIOF, including a SPE function code and an IAI identifier for causing the initiation of SS functions to one or more I/O adapters for transferring service commands and information from the SPE to the one or more I/O adapter to enable the SPE to control service operations for the I/O adapter, and executing by the IOSS of an iIOF application (IA) for performing the requested service operation by entering the IA at an address determined by the SPE function code.

5. A method of remotely providing service control functions for any number of I/O adapters by a single remote service hardware as defined in claim 4, the sending step further including:

selecting in a protected storage one or more I/O adapter function parameter areas (OFPAs) associated with one or more of the I/O adapters being selected by the SPE for an I/O service support operation, building a channel program to perform the function specified by each of the function codes, and initiating by each selected IA execution of the channel program using the SS subchannel for each associated I/O adapter.

6. A method of remotely providing service control functions for any number of I/O adapters by the remote service hardware as defined in claim 5, the sending step further including:

selecting by the SPE a function code requiring transmission of status, diagnostic and control data from an identified I/O adapter to the SPE.

7. A method of remotely providing service control functions for any number of I/O adapters by the remote service hardware as defined in claim 5, the sending step further including:

selecting by the SPE a function code for requesting a service support operation requiring transmission of control data, adapter microcode, and adapter-associated configuration information from the SPE to the I/O adapter.

8. A method of remotely providing service control functions for any number of I/O adapters by the remote service hardware as defined in claim 4, the method further comprising the steps of:

the I/O adapter being one of plural I/O adapters connected to the IOSS, each I/O adapter being connected to the IOSS by a different hardware I/O channel, assigning a different channel identifier (CHPID) to a different channel control block (channel) in the IOSS to represent the hardware channel associated with each of the I/O adapters, and accessing by the IA of an associated SS subchannel when the IA uses a channel identifier received in a service command from the SPE to find the associated SS subchannel required to control communication between the SPE and a selected one of the I/O adapters to control service operations for the I/O adapter.

9. A method of remotely providing service control functions for any number of I/O adapters by the remote service hardware as defined in claim 2, the method further comprising the steps of:

connecting to any of the I/O adapters a LAN (local area network) for enabling the computer system to communicate commands and data to/from I/O devices connected to the LAN, providing additional subchannels for operations by the LAN I/O devices, and operating the additional subchannels for the LAN I/O devices independently of the SS subchannel of the I/O adapter to which the LAN I/O devices are connected.

10. A method for enabling a single service processor element (SPE) to control service functions for any number of I/O adapters connected to an I/O subsystem (IOSS) of a computer system having one or more central processors (CPs) to eliminate a need for additional service hardware for servicing the I/O adapters, the method comprising the steps of:

structuring an internal I/O facility (iIOF) for the IOSS for executing iIOF microcoded I/O programs in the computer system, storing in a microcode memory associated with the IOSS a service support (SS) subchannel control block (SS subchannel) for each I/O adapter to receive service support by the SPE, each SS subchannel containing an interception control field (B) set to an active state, the I/O adapter service support including: initiation of operations by each of the I/O adapters, hardware configuration associated with each of the I/O adapters, or handling of error conditions occurring during operations by any of the I/O adapters, and other SS functions for any of the I/O adapters, setting to an active state the field B in each of the SS subchannels, and communicating SS signals between the SPE and the IOSS in response to an SS interrupt signal provided by any of the I/O adapters associated with an SS subchannel containing field B set to the active state, controlling the communication of the SS signals by the iIOF executing one or more I/O programs for the I/O adapter providing an SS interrupt signal, but communicating to a CP in the computer system signals associated with an I/O interrupt when the field B is set to an inactive state in an associated subchannel.

11. A method for enabling a single service processor element (SPE) to control service functions for any number of I/O adapters as defined in claim 10, the method further comprising the steps of:

selecting any one or more of the I/O adapters connected to the IOSS to concurrently perform an SS function to be signalled by the SPE, signalling the SS function by the SPE concurrently to the I/O adapters selected by the selecting step, and performing the SS function concurrently by the selected I/O adapters to obtain centralized SS control over the SS functions of the I/O adapters, the selecting step selecting all of the I/O adapters of the same type connected to the IOSS, and the signalling step concurrently signalling a common reset and microcode initialization to all of the selected I/O adapters, and the performing step being performed concurrently by all of the signalled I/O adapters to obtain a centralized efficient control by the SPE over the I/O adapters.

12. A method for enabling a single service processor element (SPE) to control service functions for any number of I/O adapters as defined in claim 11, the method further comprising the steps of:

the selecting step selecting by the SPE all I/O adapters which are to be recipients of a microcode update containing a new I/O adapter function or an adapter microcode correction, the signalling step providing a single transmission of the microcode, and the performing step being performed in parallel by all of the selected I/O adapter.

13. A method for enabling a single service processor element (SPE) to control service functions for any number of I/O adapters as defined in claim 11, the method further comprising the steps of:

the selecting step selecting an I/O adapter sending an error-recovery-request SS interruption to the SPE, the signalling step signalling to the selected I/O adapter an SS command responding to the SS interruption, and the performing step performing the SS command signalled to the selected I/O adapter.

* * * * *